United States Patent
Kwon et al.

(10) Patent No.: US 10,735,427 B2
(45) Date of Patent: Aug. 4, 2020

(54) METHOD AND APPARATUS FOR MANAGING PROGRAM OF ELECTRONIC DEVICE

(71) Applicant: Samsung Electronics Co., Ltd., Suwon-si, Gyeonggi-do (KR)

(72) Inventors: Eun Young Kwon, Seoul (KR); Yang Keun Kim, Suwon-si (KR); Jong Su Kim, Suwon-si (KR); Taeck Ki Lee, Siheung-si (KR); Dae Haeng Cho, Suwon-si (KR); Chol Seo Park, Seoul (KR); Da Som Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 15/821,982

(22) Filed: Nov. 24, 2017

(65) Prior Publication Data

US 2018/0152454 A1 May 31, 2018

(30) Foreign Application Priority Data

Nov. 28, 2016 (KR) .................. 10-2016-0159644

(51) Int. Cl.
*H04L 29/06* (2006.01)
*H04L 9/08* (2006.01)

(52) U.S. Cl.
CPC ............ *H04L 63/10* (2013.01); *H04L 9/0825* (2013.01); *H04L 9/0838* (2013.01); *H04L 9/0841* (2013.01); *H04L 9/0894* (2013.01); *H04L 63/045* (2013.01); *H04L 63/0442* (2013.01);

(Continued)

(58) Field of Classification Search
CPC ..... H04L 63/10; H04L 63/0442; H04L 63/18; H04L 9/0825; H04L 9/0838; H04L 9/0894
See application file for complete search history.

(56) References Cited

U.S. PATENT DOCUMENTS 8,924,715 B2 12/2014 Schell et al.
9,124,573 B2 * 9/2015 Chastain ............. H04L 63/0807
9,282,106 B2 * 3/2016 Fahrny .................... G06F 21/10
(Continued)

FOREIGN PATENT DOCUMENTS

JP         2016-111440 A    6/2016
KR    10-2016-0035999 A    4/2016
(Continued)

*Primary Examiner* — Hee K Song
(74) *Attorney, Agent, or Firm* — Jefferson IP Law, LLP

(57) ABSTRACT

An electronic device and a program management method therefor are provided. The electronic device includes a communication interface, a memory, at least one processor, and a secure circuitry. The secure circuitry is configured to provide a first public key stored in the secure circuitry to the at least one processor. The at least one processor is configured to transmit the first public key to an external device and receive an encrypted secure program encrypted based on the first public key and a second public key generated by the external device, from the external device. The at least one processor is further configured to transmit the second public key and the encrypted secure program to the secure circuitry. The secure circuitry is configured to decrypt the encrypted secure program based on the second public key and a first private key which is symmetrical to the first public key.

18 Claims, 15 Drawing Sheets

(52) U.S. Cl.
CPC ............ *H04L 63/061* (2013.01); *H04L 63/18* (2013.01); *H04L 2463/061* (2013.01)

(56) References Cited

U.S. PATENT DOCUMENTS

| | | | |
|---|---|---|---|
| 9,473,932 B2 | 10/2016 | Lessiak et al. | |
| 9,591,484 B2* | 3/2017 | Ionescu | H04W 12/06 |
| 9,882,902 B2* | 1/2018 | Chastain | H04W 12/06 |
| 9,904,806 B2 | 2/2018 | Ju | |
| 10,432,611 B2* | 10/2019 | Luo | H04L 63/0442 |
| 2009/0161826 A1* | 6/2009 | Gertner | A61N 5/1017 378/65 |
| 2009/0161876 A1* | 6/2009 | Sherkin | H04L 9/3066 380/278 |
| 2012/0108205 A1 | 5/2012 | Schell et al. | |
| 2013/0281058 A1* | 10/2013 | Obaidi | H04W 12/06 455/411 |
| 2014/0013406 A1* | 1/2014 | Tremlet | G06F 21/32 726/5 |
| 2014/0047235 A1 | 2/2014 | Lessiak et al. | |
| 2014/0317686 A1* | 10/2014 | Vetillard | G06F 21/606 726/2 |
| 2016/0006729 A1* | 1/2016 | Yang | H04L 63/0428 713/156 |
| 2016/0127126 A1 | 5/2016 | Sohn et al. | |
| 2016/0232381 A1 | 8/2016 | Ju | |
| 2016/0239686 A1 | 8/2016 | Kwon et al. | |
| 2017/0041312 A1* | 2/2017 | Luo | H04L 63/0442 |
| 2017/0208045 A1 | 7/2017 | Huh et al. | |
| 2017/0357960 A1* | 12/2017 | Quentin | G06Q 20/02 |
| 2018/0165673 A1* | 6/2018 | Francis | G06F 21/57 |
| 2019/0005229 A1* | 1/2019 | Hlaing | G06F 8/61 |
| 2019/0238342 A1* | 8/2019 | Lian | H04L 9/0894 |
| 2019/0297084 A1* | 9/2019 | Li | H04W 12/08 |

FOREIGN PATENT DOCUMENTS

| | | |
|---|---|---|
| KR | 10-2016-0058375 A | 5/2016 |
| KR | 10-2016-0101635 A | 8/2016 |
| KR | 10-2017-0020137 A | 2/2017 |

* cited by examiner

METHOD AND APPARATUS FOR MANAGING PROGRAM OF ELECTRONIC DEVICE

CROSS-REFERENCE TO RELATED APPLICATION(S)

This application claims the benefit under 35 U.S.C. § 119(a) of a Korean patent application filed on Nov. 28, 2016 in the Korean Intellectual Property Office and assigned Serial number 10-2016-0159644, the entire disclosure of which is hereby incorporated by reference.

TECHNICAL FIELD

The present disclosure relates to a method and apparatus for managing a program of an electronic device.

BACKGROUND

An electronic device, for example, a smartphone or a tablet may include a secure circuitry (e.g., an embedded secure element (eSE)). The secure circuitry may include, for example, a circuitry for storing secure information (e.g., personal information, payment information, or the like). The secure circuitry may be used for a payment process or the like which uses an external electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for a secure circuitry of an electronic device may have, for example, a removable form or an embedded type. The electronic device may manage the secure circuitry by control (e.g., a command) of a reliable external electronic device (e.g., a server) to control access from the outside to secure information.

If a program of the secure circuitry is executed (e.g., an applet is deleted, installed, updated, or the like) by only control of the external electronic device (e.g., the server), communication data costs according to management of the external electronic device may be increased and a time taken to download or install a program may be increased.

In accordance with an aspect of the present disclosure, an electronic device is provided. The electronic device includes a communication interface configured to communicate with an external device, a memory, at least one processor, and a secure circuitry connected with the at least one processor over a secure channel. The secure circuitry may be configured to provide a first public key stored in the secure circuitry to the at least one processor. The at least one processor may be configured to transmit the first public key to the external device via the communication interface, receive an encrypted secure program encrypted based on the first public key and a second public key generated by the external device, via the communication interface from the external device, and transmit the second public key and the encrypted secure program to the secure circuitry. The secure circuitry may be configured to decrypt the encrypted secure program based on the second public key and a first private key which is symmetrical to the first public key.

Another aspect of the present disclosure is to provide an electronic device and a method for allowing an external device to encrypt a program using a unique key in a secure circuitry. Thus, the electronic device and the method may provide security of a program provided from the external device to the electronic device.

Another aspect of the present disclosure is to provide an electronic device and the method for storing a unique key differently set according to each secure circuitry or a common key (or the same key) set to be the same as another secure circuitry in a secure circuitry, may select the unique key or the common key by reflecting a characteristic of a secure program, a characteristic of an external device which encrypts a program, or the like, and may determine an encryption scheme of the secure program.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
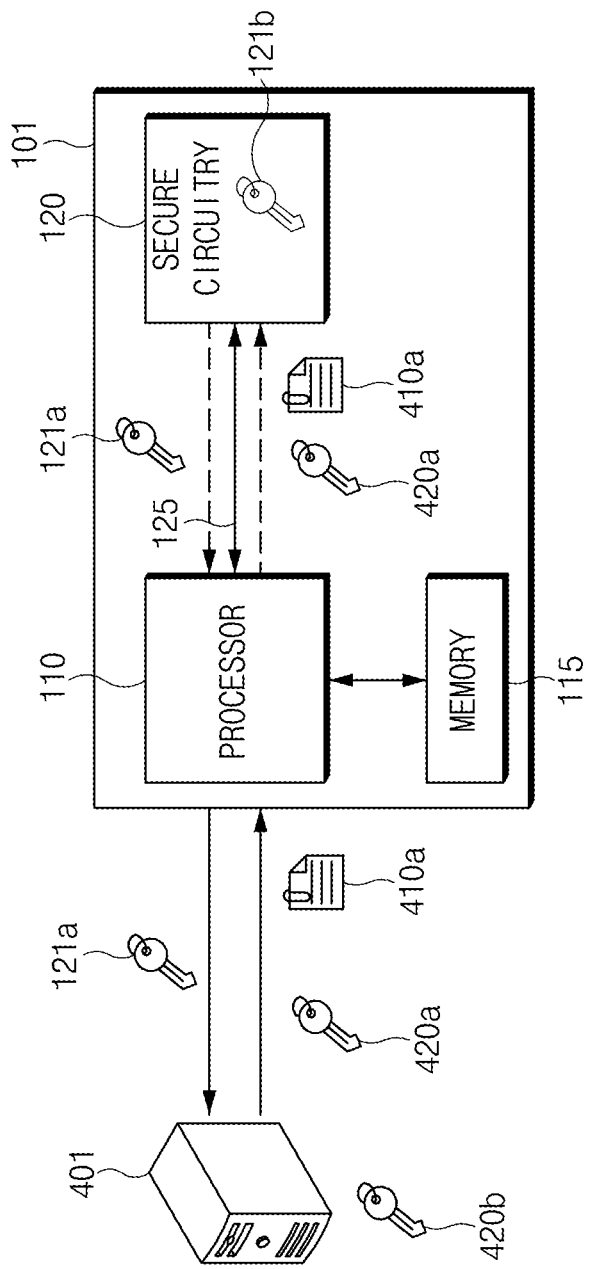
FIG. 1 is a block diagram illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there is no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. Central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital versatile disc (DVD) player, an audio, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

A secure circuitry disclosed in the present disclosure may include, for example, a circuitry which stores secure data and/or ensures a protected command execution environment. The secure circuitry may exist in, for example, a removable smart chip or a secure digital (SD) card or may be embedded in a fixed chip of an electronic device. In various embodiments, the secure circuitry may be loaded into a subscriber identity module (SIM) card or may include a circuitry loaded into a finance related smart card. The secure circuitry may include a sub-circuit, for example, a cryptographic processor or a random number generator. The secure circuitry may operate based on a smart card operating system (OS), for example, a JavaCard open platform (JCOP). Further, the secure circuitry may include, for example, an embedded secure element (eSE) in the fixed chip of the electronic device. An eSE disclosed in the present disclosure may be, but is not limited to, an example of the secure circuitry.

FIG. 1 is a block diagram illustrating a configuration of an electronic device according to various embodiments of the present disclosure.

Referring to FIG. 1, an electronic device 101 may include a processor 110 (e.g., at least one processor), a memory 115 (e.g., a storage), and a secure circuitry 120 (e.g., an eSE). The processor 110 may be connected to, for example, the secure circuitry 120 over a secure channel 125.

According to various embodiments, the processor 110 may include one or more of a central processing unit (CPU), an application processor (AP), or a communication processor (CP). The processor 110 may execute, for example, an arithmetic operation or data processing about control and/or communication of at least one other element(s) of the electronic device 101.

According to various embodiments, the processor 110 may include an area for performing a normal arithmetic operation and/or an area for performing an arithmetic operation associated with processing data (e.g., payment information or the like) associated with security. Additional information about a configuration of the processor 110 may be provided with reference to FIG. 2.

According to various embodiments, the memory 115 may include a volatile and/or non-volatile memory. The memory 115 may store, for example, instructions or data processed by the processor 110. In various embodiments, the memory 115 may store encrypted program data executable by the secure circuitry 120. For example, the memory 115 may store a secure program encrypted (e.g., a script encrypted) by the secure circuitry 120 or may store a public key associated with a key for encrypting a secure program.

According to various embodiments, the secure circuitry 120 may include a circuitry which stores secure data and/or ensures a protected command execution environment. The secure circuitry 120 may be implemented to be independent of, for example, the processor 110 and the memory 115 to be embedded in a fixed chip. The secure circuitry 120 may provide, for example, security which is relatively strong with respect to a physical attack or a hacking attack.

The secure circuitry 120 may store unique asymmetric keys (e.g., a first public key 121a and a first private key 121b). The first public key 121a and the first private key 121b may be previously inserted and stored at a time when the secure circuitry 120 is manufactured or may be stored through the processor 110 after being mounted on the electronic device 101.

The secure circuitry 120 may provide the first public key 121a to the processor 110. The processor 110 may transmit the first public key 121a to an external device 401 via a communication interface (not shown). The external device 401 may encrypt a secure program using the received first public key 121a and any asymmetric keys (e.g., a second public key 420a and a second private key 420b) generated therein. The external device 401 may transmit the second public key 420a and an encrypted secure program 410a to the electronic device 101.

The processor 110 may receive the second public key 420a and the encrypted secure program 410a via a communication interface and may transmit the second public key 420a and the encrypted secure program 410a to the secure circuitry 120 depending on a specified condition or process.

The secure circuitry 120 may decrypt the encrypted secure program 410a using the second public key 420a and the first private key 121b in the secure circuitry 120. The secure circuitry 120 may execute its secure program to perform a specified function (e.g., delete, install, or update an applet).

Information about a process of receiving and decrypting the encrypted secure program 410a from the processor 110 at the secure circuitry 120 may be provided with reference to FIGS. 2 to 10.

According to various embodiments, a secure channel 125 may include a channel, established between the processor 110 and the secure circuitry 120, for transmitting and receiving data. The secure channel 125 may establish, for example, a local path in which the processor 110 may directly control the secure circuitry 120 without having an influence on an external network (e.g., a wireless Internet).

The processor 110 may directly transmit and receive, for example, a control signal over the secure channel 125 without passing through a separate communication module (e.g., a near field communication (NFC) module or the like). Further, the processor 110 may receive, for example, a result corresponding to the control signal from the secure circuitry 120.

According to various embodiments, the secure channel 125 may be implemented over a physical channel such as a serial peripheral interface (SPI), recommended standard 232 (RS232), or an inter-integrated circuit (I2C). For example, if the secure channel 125 is implemented with the SPI, it may be implemented in the form of a serial bus configured with four lines which directly connect the processor 110 with the secure circuitry 120. For another example, if the secure channel 125 is implemented with the I2C, it may be implemented with one data line.

In various embodiments, the processor 110 and the secure circuitry 120 may transmit and receive data with each other through a specified protocol. The processor 110 and the secure circuitry 120 may generate, for example, keys for establishing a channel, respectively, and may establish a channel for transmitting and receiving data through a provisioning process. Additional information about the provisioning process may be provided with respect to FIGS. 9 and 10.

Figure 2:
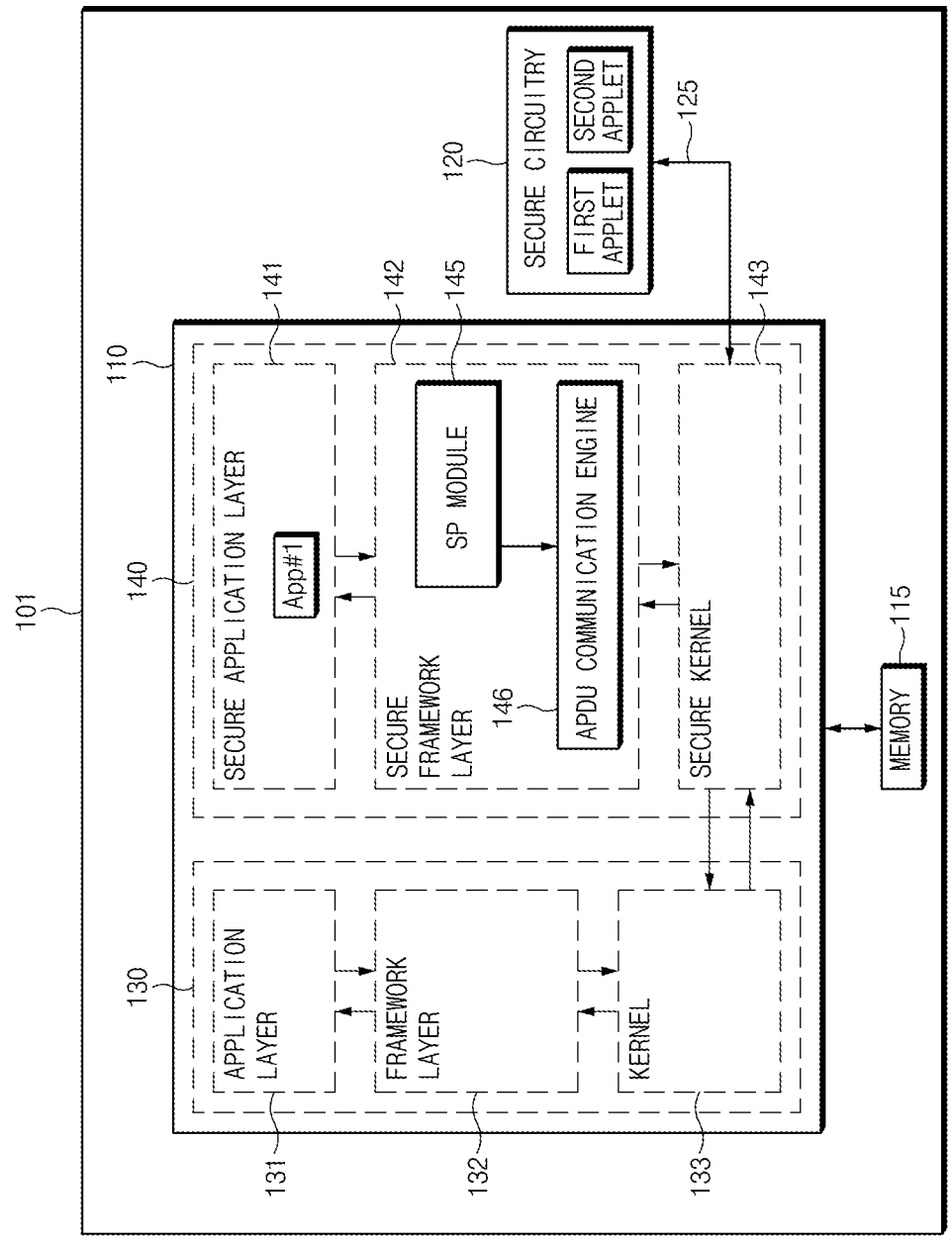
FIG. 2 is a block diagram illustrating a configuration of an electronic device according to various embodiments of the present disclosure.

FIG. 2 is a block diagram illustrating a configuration of an electronic device according to various embodiments of the present disclosure.

Referring to FIG. 2, an electronic device 101 may include a processor 110, a memory 115, and a secure circuitry 120.

The processor 110 may include, for example, a rich execution environment (REE) 130 and/or a trusted execution environment (TEE) 140. The processor 110 may process data for requesting a relatively high security level through the TEE 140. The REE 130 and the TEE 140 may be implemented in, for example, the form of being physically divided, the form of being divided in software, or the form of being physically divided and being divided in software. The TEE 140 may be connected to, for example, the secure circuitry 120 over a secure channel 125.

The processor 110 may access the secure circuitry 120 through the TEE 140 and/or the secure channel 125 rather than the REE 130. The processor 110 may store or execute information or a program for requesting a relatively high security level in the secure circuitry 120 through the TEE 140 and the secure channel 125. The REE 130 may perform, for example, a usual arithmetic task with a low relation with a security task. The REE 130 may include one or more of a CPU, an AP, or a CP. The REE 130 may execute an arithmetic operation or data processing about control and/or communication of at least one other element(s) (e.g., the memory 115, a communication interface (not shown), or the like).

In various embodiments, the REE 130 may receive an encrypted secure program and additional information associated with the encrypted secure program from an external device (e.g., an external server, a desktop personal computer (PC), a short-range wireless communication device, or the like). The REE 130 may provide the encrypted secure program or the additional information to the TEE 140.

According to various embodiments, the REE 130 may include an application layer 131, a framework layer 132, and a kernel 133.

The application layer 131 may include, for example, an OS for controlling a resource associated with an electronic device (e.g., the electronic device 101) and/or various applications driven on the OS.

The framework layer 132 may process, for example, one or more task requests, received from the application layer 131, in a priority order. The framework layer 132 may perform scheduling, load balancing, or the like for the one or more task requests by processing the one or more task requests in the priority order. In various embodiments, the framework layer 132 may include a library necessary for driving the REE 130.

The kernel 133 may control or manage, for example, system resources (e.g., a bus (not shown), the processor 110, the memory 115, or the like) used for executing an operation or a function implemented in another program (e.g., the framework layer 132 or the application layer 131). In various embodiments, the kernel 133 may include a driver for driving the TEE 140.

The TEE 140 may include, for example, an area for performing secure data communication. For example, the processor 110 may provide an arithmetic or secure program associated with processing data (e.g., payment information or the like) associated with security to the secure circuitry 120. In various embodiments, the TEE 140 may have a key (e.g., a secret key) shared with the secure circuitry 120 and may establish a channel which may transmit and receive encrypted data with the secure circuitry 120 using the key.

In various embodiments, the TEE 140 may receive an encrypted secure program of a binary form through the REE 130 from an external device. The TEE 140 may verify, for example, a key signature of the encrypted secure program of the binary form and may certify the key signature.

According to various embodiments, the TEE 140 may provide the encrypted secure program to the secure circuitry 120. The secure circuitry 120 may decrypt the encrypted secure program using a key generated by the secure circuitry 120 and may execute the decrypted secure program to execute various functions. The encrypted secure program may be provided through, for example, a local path established between the TEE 140 included in the processor 110 and the secure circuitry 120, rather than an external device (e.g., a trusted service manager (TSM) server).

For example, the encrypted secure program may include a script in which an executable load file (ELF) for installing (or deleting or updating) an applet which executes a specified function is encrypted. The REE 130 may receive, for example, an encrypted secure program from an external server and may provide the encrypted secure program to the TEE 140. If the encrypted secure program meets a specified condition (e.g., a condition for effectively generating a key for decrypting the encrypted secure program), the TEE 140 may provide the encrypted secure program to the secure circuitry 120.

According to various embodiments, if the secure circuitry 120 generates a decryption key for decrypting the encrypted secure program, the TEE 140 may certify validity of the generated decryption key. The TEE 140 may be unnecessary to store, for example, a key for decrypting a secure program and may receive key verification information (e.g., a receipt signal) for verifying validity of a key generated by the secure circuitry 120 from the secure circuitry 120. The TEE 140 may compare, for example, key certification information stored together with the encrypted secure program with the key verification information to verify validity of the generated key.

According to various embodiments, the TEE 140 may include a secure application layer 141, a secure framework layer 142, and a secure kernel 143.

The secure application layer 141 may include, for example, an application which requests a relatively higher security level than usual data. For example, the secure application layer 141 may include a payment app (e.g., an online payment app or an offline payment app), a user authentication app (e.g., a biometric recognition app such as a fingerprint recognition app or an iris recognition app), or the like.

The secure framework layer 142 may process, for example, one or more task requests, received from the secure application layer 141, in a priority order. The secure framework layer 142 may perform a function for encrypting data transmitted to the secure circuitry 120. The secure framework layer 142 may include, for example, a secure protocol (SP) module 145 and an application protocol data unit (APDU) communication engine 146. The APDU communication engine 146 may communicate according to a message standard defined in, for example, international organization for standardization (ISO) 7816-4.

The SP module 145 may include, for example, a module which encrypts one or more task requests, received from the application layer 131, using a key shared with the secure circuitry 120 (e.g., a key for establishing a channel, referred to as "channel key"). The channel key may be shared through a provisioning process or the like. According to various embodiments, the provisioning process may be a process of sharing a channel key for establishing a session between the TEE 140 and the secure circuitry 120. The provisioning process may progress through, for example, a key exchange request of the TEE 140 and a key exchange response of the secure circuitry 120.

The TEE 140 may transmit, for example, the key exchange request to the secure circuitry 120. The key exchange request may include, for example, an algorithm identifier, a process identifier, a public key according to a specified secure algorithm, or the like.

The secure circuitry 120 may verify, for example, a specified condition (e.g., information indicating whether there is a stored key, state information of the secure circuitry 120, or the like) and may generate a first channel key depending on the specified condition. For example, the secure circuitry 120 may calculate a key derivation function (KDF) based on a private key of the secure circuitry 120 and a public key, an identifier, an eSE identifier, or the like of the TEE 140 and may generate a key using the calculated KDF.

The secure circuitry 120 may transmit, for example, the key exchange response to the processor 110. If it succeeds in generating and storing a key, the key exchange response may include a success code. If it fails in generating and storing the key, the key exchange response may include an error code. In various embodiments, the secure circuitry 120 may transmit a key (e.g., a public key) generated for exchanging a key with the processor 110 and message authentication code (MAC) data as a response.

For example, if receiving a success code, the TEE 140 may calculate a private key of the secure circuitry 120 and a public key, a process identifier, an eSE identifier, or the like of the TEE 140 as factors and may generate and store a first channel key using the calculated factors.

The APDU communication engine 146 may be, for example, a module which converts data into a format recognizable by the secure circuitry 120.

The secure channel 143 may control or manage, for example, system resources (e.g., the bus, the processor 110, the memory 115, or the like) used for executing an operation or a function implemented in another program (e.g., the secure framework layer 142 or the secure application layer 141). In various embodiments, the secure channel 143 may include a secure circuitry driver (not shown). The secure circuitry driver may provide an interface for transmitting data between the TEE 140 and the secure circuitry 120.

The secure circuitry 120 may receive, for example, an encrypted secure program from the TEE 140 and may decrypt the secure program using a decryption key generated in the TEE 120. The secure circuitry 120 may execute the secure program to perform a specified function (e.g., delete, install, or update an applet).

According to various embodiments, the secure circuitry 120 may receive a second public key 420*a* (transmitted to an external device 401 of FIG. 1) provided from the TEE 140 and may generate a shared key using the second public key 420*a* and a first private key 121*b* in the secure circuitry 120. The secure circuitry 120 may generate a decryption key for decrypting the encrypted secure program using the shared key.

According to various embodiments, the secure circuitry 120 may generate key verification information (e.g., a receipt signal) for verifying validity of the generated shared key and may transmit the generated key verification information to the TEE 140 to certify validity of the shared key. If the validity of the shared key is verified in the TEE 140, the secure circuitry 120 may receive an encrypted secure program from the TEE 140. The secure circuitry 120 may decrypt the encrypted secure program using a decryption key.

Additional information about the process of generating the shared key and the decryption key at the secure circuitry 120 and the process of receiving and decrypting the encrypted secure program at the secure circuitry 120 may be provided with reference to FIGS. 2 to 10.

According to various embodiments, if the execution of the secure program in the secure circuitry 120 is completed, an applet which performs a specified function may be installed in the secure circuitry 120 (or delete or update a previous applet). The installed applet may perform the specified function (e.g., lock/unlock a card) in the secure circuitry 120.

In FIG. 2, an embodiment is exemplified as all the elements are included in the one electronic device 101. However, various embodiments are not limited thereto. For example, at least some of the elements of the electronic device 101 may be implemented to be distributed to the electronic device 101 and an external electronic device according to a role, a function, or performance of the electronic device 101. For example, the processor 110 and/or the memory 115 of the electronic device 101 may be included in another electronic device, and the secure circuitry 120 may be included in another electronic device. Various embodiments of the present disclosure are not limited thereto. For example, the processor 110, the memory 115, or the secure circuitry 120 may be located in various areas of the electronic device 101.

Figure 3:
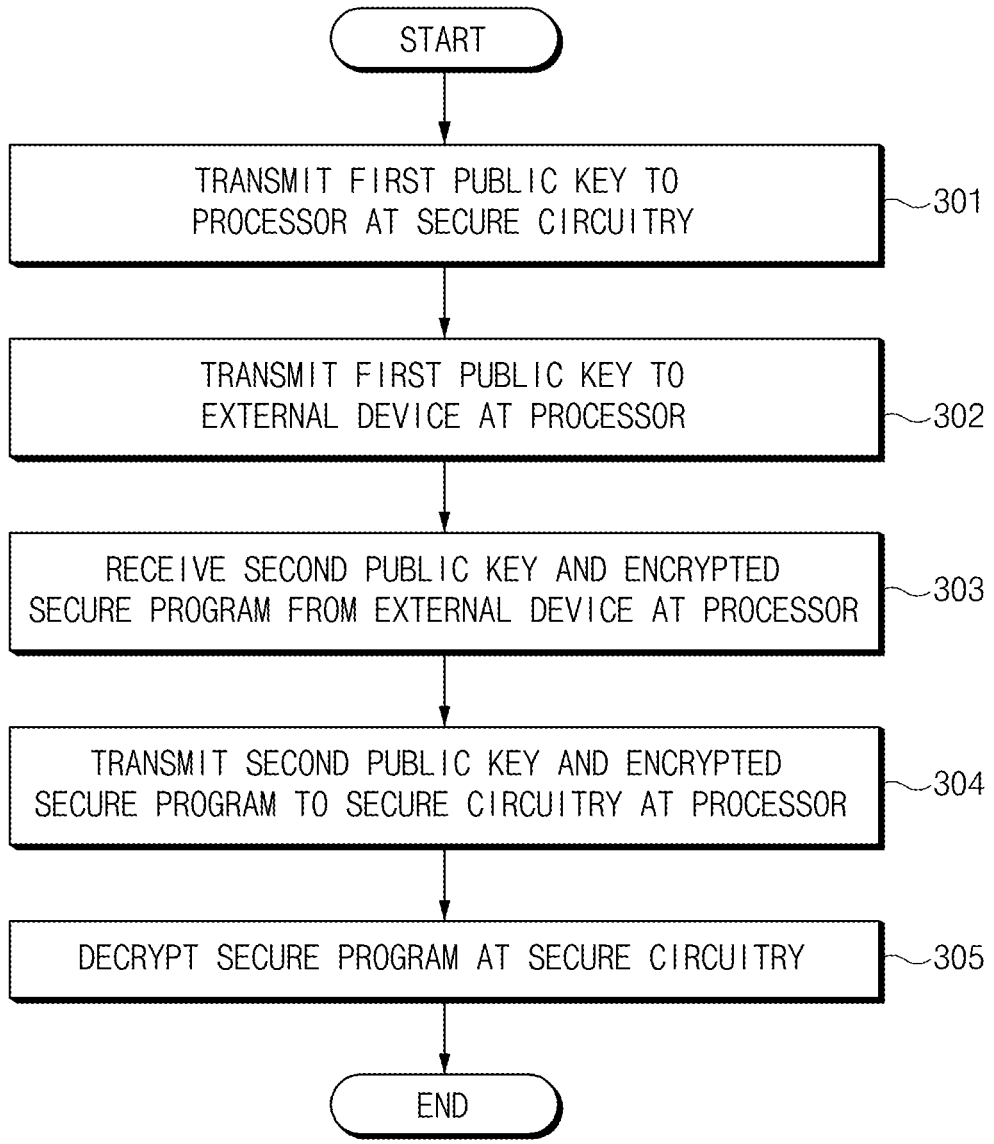
FIG. 3 is a flowchart illustrating a program management method according to various embodiments of the present disclosure.

FIG. 3 is a flowchart illustrating a program management method according to various embodiments of the present disclosure.

Referring to FIG. 3, in operation 301, a secure circuitry 120 of FIG. 2 may provide a first public key 121*a* uniquely stored therein to a processor 110 of FIG. 2. In an embodiment, the secure circuitry 120 may store a first private key 121*b* uniquely assigned to each chip at a time when manufactured. The secure circuitry 120 may generate the first public key 121a using the first private key 121b and may provide the generated first public key 121a to the processor 110. In another embodiment, the secure circuitry 120 may store asymmetric keys (e.g., the first public key 121a and the first private key 121b) uniquely assigned to each chip at a time when manufactured. The secure circuitry 120 may provide the first public key 121a between the stored asymmetric keys to the processor 110.

According to various embodiments, the secure circuitry 120 may transmit the first public key 121a to a TEE 140 of FIG. 2 over a secure channel 125 of FIG. 2.

According to various embodiments, the secure circuitry 120 may provide the first public key 121a automatically or by a request of the processor 110. For example, if a payment app is executed, the secure circuitry 120 may provide the first public key 121a by a request of the processor 110. For another example, the secure circuitry 120 may provide the first public key 121a to the processor 110, if power of an electronic device 101 of FIG. 2 is supplied or over a specified time period.

According to various embodiments, the secure circuitry 120 may store a unique key (e.g., the first public key 121a and the private key 121b) uniquely set for each secure circuitry and a common key identically set for each secure circuitry. A secure program may be executed using one of the unique key or the common key according to a request of the processor 110, a characteristic of the secure program, a characteristic of an execution application, or the like. For example, if a secure program encrypted using the unique key is transmitted, a process for providing a unique public key (e.g., the first public key 121a) may be preceded before the encrypted secure program is received. For another example, if a secure program encrypted using the general key is transmitted, the secure circuitry 120 may fail to provide a separate key to the outside.

In operation 302, the processor 110 may transmit the first public key 121a, received from the secure circuitry 120, to an external device 410 of FIG. 1 via a communication interface. In an embodiment, the first public key 121a may be transmitted to the external device 401 in the form of a certificate.

The external device 401 may extract the first public key 121a by certifying the certificate. The external device 401 may encrypt a secure program using the first public key 121a. Additional information about the process of encrypting the secure program at the external device 401 may be provided with reference to FIGS. 4A and 4B.

In operation 303, the processor 110 may receive a second public key 420a and an encrypted secure program 410a, generated by the external device 401, via the communication interface. The second public key 420a may be a public key between any asymmetric keys generated in the external device 401. The processor 110 may store the encrypted secure program 410a in a memory 115 of FIG. 2. The encrypted secure program 410a may be a script in which an ELF for installing (deleting or updating) an applet which executes a specified function is encrypted.

According to various embodiments, the encrypted secure program 410a may be provided from the external device 401 (e.g., an external server, a desktop PC, a laptop, a short-range wireless communication device, or the like) to the processor 110. For example, the encrypted secure program 410a may be downloaded in the form of an Android application package (APK) file from App store (e.g., Google Play store or the like) and may be provided in an over-the-air (OTA) scheme for updating an OS.

In operation 304, the processor 110 may transmit the second public key 420a and the encrypted secure program 410a to the secure circuitry 120. In an embodiment, the processor 110 may primarily transmit the second public key 420a to the secure circuitry 120 such that the secure circuitry 120 certifies validity of generation of a key for decryption.

If certification about key generation is completed, the processor 110 may secondarily transmit the encrypted secure program 410a to the secure circuitry 120 such that the secure circuitry 120 may execute a secure program (e.g., install, delete, or update an applet).

In operation 305, the secure circuitry 120 may decrypt the encrypted secure program 410a based on the second public key 420a and a first private key 121b which is symmetrical to the first public key 121a. The secure circuitry 120 may execute a secure program to perform a specified function (e.g., delete, install, or update an applet).

According to various embodiments, the secure circuitry 120 may generate a shared key shared with the external device 401, using the second public key 420a and the first private key 121b. The secure circuitry 120 may generate key verification information for verifying validity of the generated shared key and may provide the generated key verification information to the TEE 140. For example, the key verification information may be a receipt value for certifying validity of the shared key.

For example, if the key verification information is valid, the processor 110 may provide the encrypted secure program 410a to the secure circuitry 120. The processor 110 may previously store key certification information corresponding to the key verification information. The key certification information may be information added in a process of encrypting the secure program at the external device 401.

For example, in a process of encrypting each secure program, the external device 401 may generate any asymmetric keys (e.g., the second public key 420a and a second private key 420b) and may generate a shared key by combining the second private key 420b with the first public key 121a transmitted from the electronic device 101. The external device 401 may add a hash value of receipt for the shared key to a script as key certification information.

If a shared key generated in the secure circuitry 120 is identical to a shared key generated in an encryption process in the external device 401, a hash value of key verification information may be the same as key certification information. If verifying that the hash value of the key verification information is identical to the key certification information to determine that the shared key generated in the secure circuitry 120 is identical to the shared key used for encryption in the external device 401, the TEE 140 may provide a stored encrypted secure program to the secure circuitry 120 using the secure channel 125.

Figure 4A:
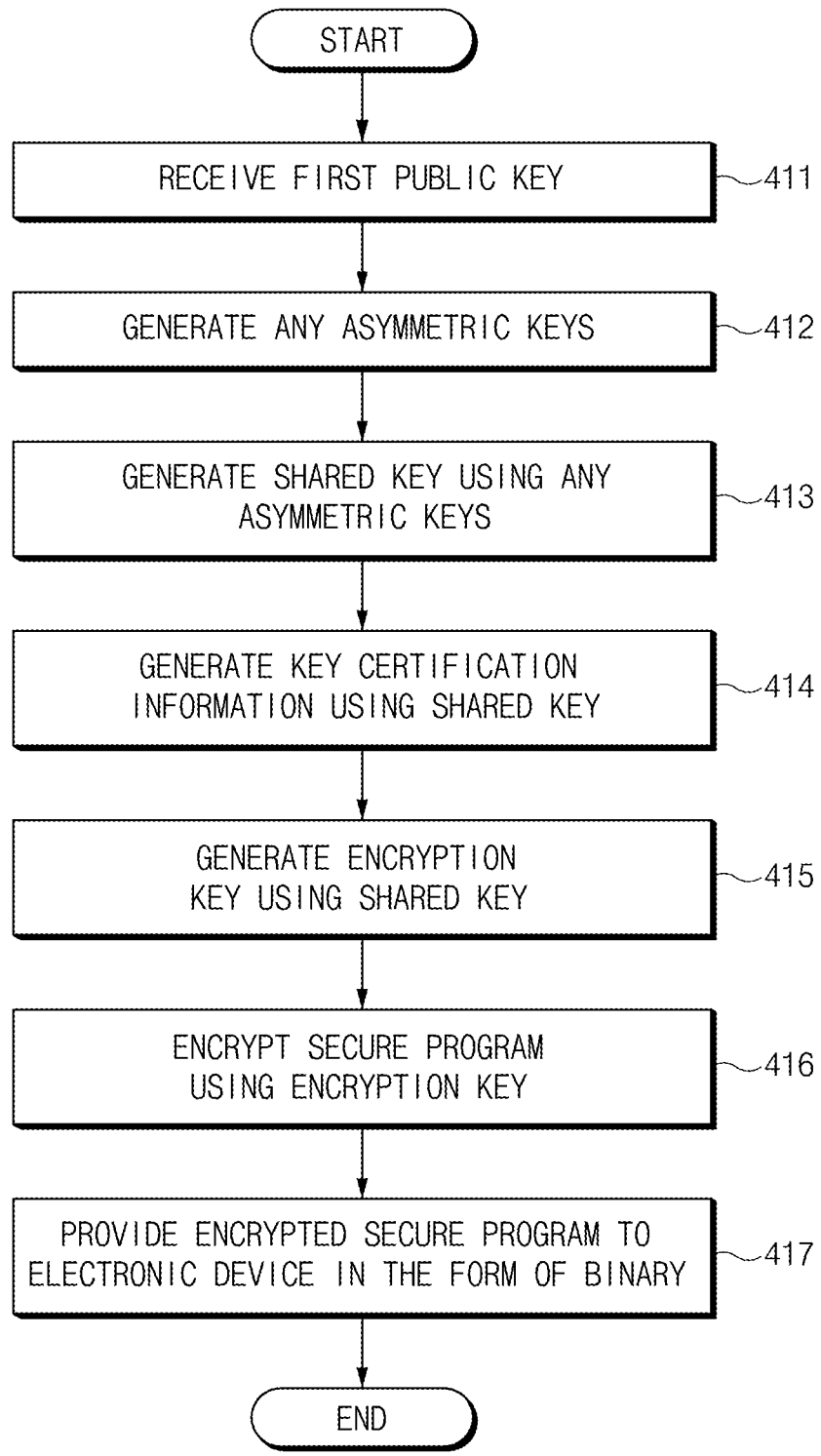
FIGS. 4A and 4B are a flowchart and a drawing illustrating a method for encrypting a secure program performed in an external device according to various embodiments of the present disclosure.
Figure 4B:
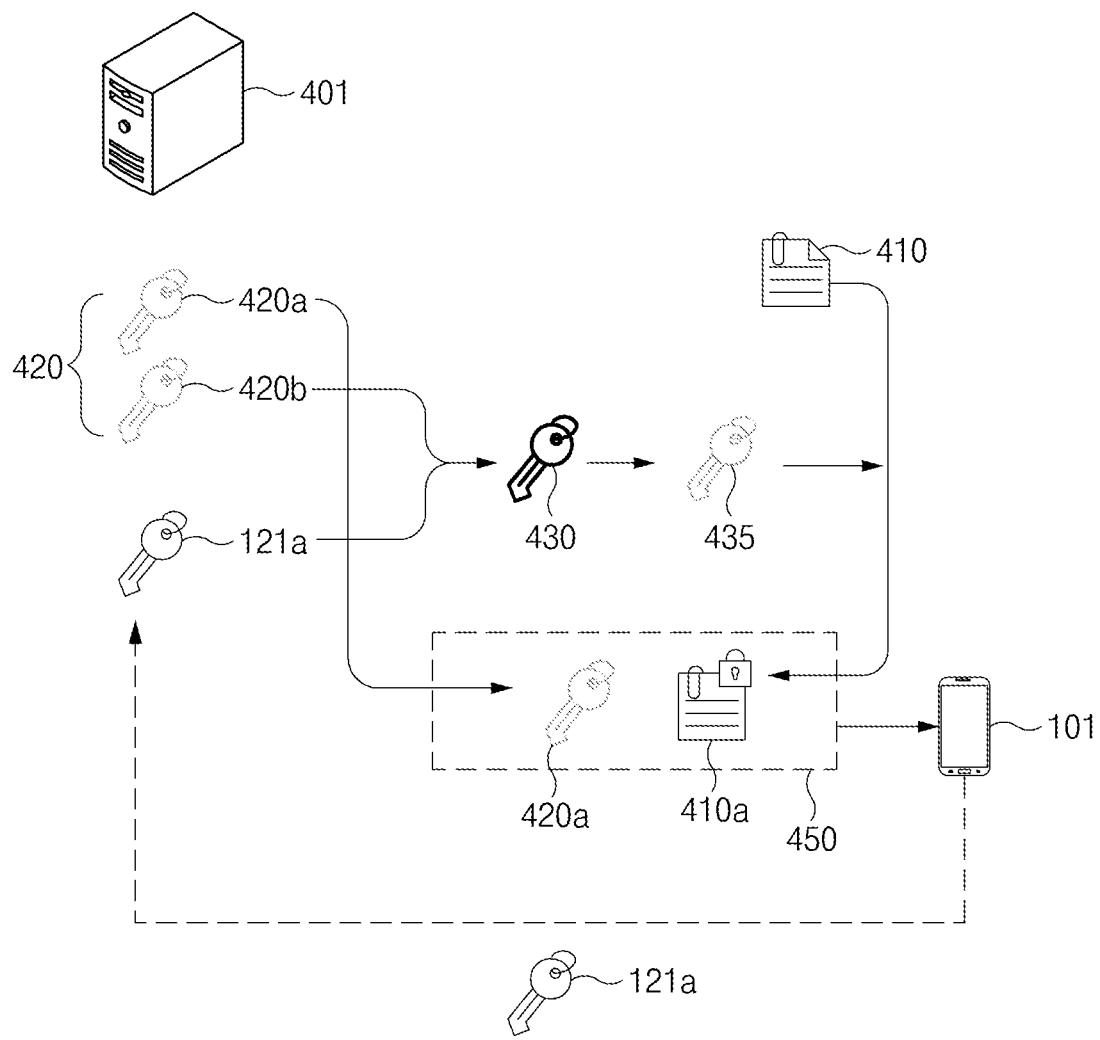

FIGS. 4A and 4B are a flowchart and a drawing illustrating a method for encrypting a secure program performed in an external device according to various embodiments of the present disclosure.

Referring to FIGS. 4A and 4B, in operation 411, an external device 401 may receive a first public key 121a from an electronic device 101. The public key 121a may be a key uniquely assigned to a secure circuitry 120 of FIG. 2 (or the electronic device 101). The secure circuitry 120 may store a first private key 121b corresponding to the first public key 121a.

Before or after receiving the first public key 121a from the electronic device 101, the external device 401 may generate or store a secure program (e.g., an ELF) to be provided to the electronic device 101. In operation 412, the external device

401 may generate, for example, any asymmetric keys 420 (e.g., a second public key 420a and a second private key 420b) corresponding to each secure program 410. The second public key 420a between the generated asymmetric keys 420 may be provided together with an encrypted secure program 410a to the electronic device 101.

In operation 413, the external device 401 may generate a shared key 430 for encrypting the secure program 410 using the received first public key 121a and the second private key 420b.

For example, if the secure circuitry 120 is an eSE chip, unique asymmetric keys (e.g., the first public key 121a and a first private key 121b) may be generated at a time when a chip is manufactured and the first public key 121a and the first private key 121b may be inserted into the eSE chip.

The external device 401 may receive and store the first public key 121a corresponding to the first private key 121b stored in the secure circuitry 120 in operation 411. The external device 401 may generate the shared key 430 by combining the first public key 121a with the second private key 420b generated in operation 412. The shared key 430 may be the same as a shared key generated in the secure circuitry 140.

In operation 414, the external device 401 may generate key certification information using the shared key 430. The external device 401 may add a hash value of receipt for the generated shared key 430 to a script as key certification information. Thereafter, the key certification information may be used to verify whether a shared key generated by the secure circuitry 120 is the same as the shared key 430 generated by the external device 401.

In operation 415, the external device 401 may generate an encryption key (corresponding to a decryption key generated by the secure circuitry 120) using the shared key 430.

In operation 416, the external device 401 may encrypt the secure program 410 using the encryption key 435 generated from the shared key 430. In various embodiments, the external device 401 may generate a token including a command necessary for executing the secure program 410 and may sign the token using a token verification key. The security circuitry 120 of the electronic device 101 may certify integrity of the token.

According to various embodiments, if the external device 401 provides a plurality of secure programs to the electronic device 101, it may generate a different asymmetric key 420 per secure program and may generate a different shared key 430 based on each asymmetric key 420. The external device 401 may encrypt each secure program using the shared key 430.

In operation 417, the external device 401 may provide the encrypted secure program 410a to the electronic device 101 in the form of a binary 450 (which may include key certification information and the second public key 420a). The binary 450 may be encrypted and signed using a separate key. For example, the encrypted secure program 410a may be downloaded from App store (e.g., Google Play store or the like) to the electronic device 101 in the form of an APK file or may be provided to the electronic device 101 in an OTA scheme for upgrading an OS.

In various embodiments, the external device 401 may collect a second public key and a token for each of a plurality of secure programs to form a binary and may sign using a separate key to certify integrity of the binary.

Figure 5:
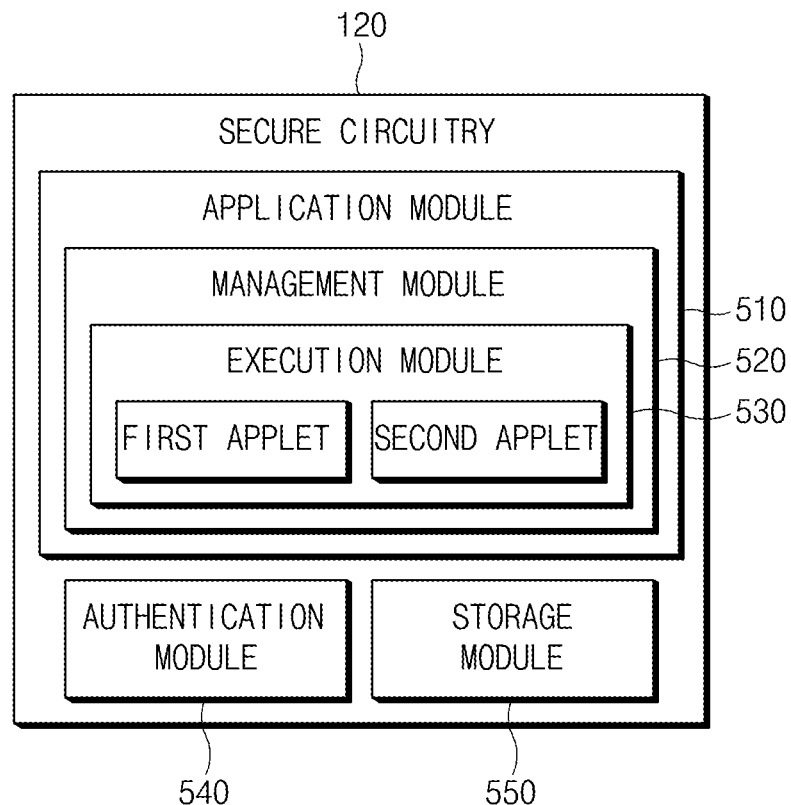
FIG. 5 is a block diagram illustrating a configuration of a secure circuitry according to various embodiments of the present disclosure.

FIG. 5 is a block diagram illustrating a configuration of a secure circuitry according to various embodiments of the present disclosure.

Referring to FIG. 5, a secure circuitry 120 may include an application module 510, a management module 520, an execution module 530, an authentication module 540, and a storage module 550. The execution module 530 may include, for example, at least one or more applets (e.g., a first applet, a second applet, or the like). The applet may include, for example, an application which executes a specified function.

The application module 510 may receive, for example, a decrypted secure program from the management module 520 and may certify the secure program. If the certified result is valid, the application module 510 may transmit the result to the management module 520. In various embodiments, the application module 510 may review validity of a token provided from the management module 520 (e.g., verify the validity of the token using a token verification key).

The management module 520 may establish, for example, a channel for transmitting and receiving data with a TEE 140 of FIG. 2. The management module 520 may request the authentication module 540 to generate a shared key. For example, if the shared key is validly generated, the management module 520 may generate a decryption key using the shared key and may request the application module 510 to certify a secure program. If receiving the result that certification is valid from the application module 510, the management module 520 may decrypt and execute the secure program using the decryption key.

The execution module 530 may be, for example, an area where a program (e.g., an applet) driven in the secure circuitry 120 is installed. For example, if a payment application is executed in the TEE 140, an applet according to each card issuer installed in the execution module 530 may be executed.

The authentication module 540 may store a first public key 121a and a first private key 121b of FIG. 1. The authentication module 540 may generate, for example, a shared key and may generate key verification information for determining validity of the shared key. The shared key may be generated by combining a second public key provided from the TEE 140 (e.g., a public key generated by the external device 401 of FIG. 2) with the first private key 121b stored in the authentication module 540. The key verification information may be a receipt value for certifying validity of the shared key. The authentication module 540 may transmit the generated shared key to the management module 520. The management module 520 may allow the TEE 140 to certify validity of the shared key.

The storage module 550 may be, for example, an applet which stores secure data in the secure circuitry 120. According to various embodiments, the storage module 550 may store a connection key for allowing the TEE 140 to access the management module 520. The connection key may be stored at a time when the secure circuitry 120 is manufactured and may be provided to the TEE 140 if an authentication process is completed. Additional information about the authentication of the connection key may be provided with reference to FIG. 6.

In FIG. 5, an embodiment is exemplified as all the elements of the secure circuitry 120 are included in the one secure circuitry 120. However, various embodiments are not limited thereto. For example, at least some of the elements of the secure circuitry 120 may be implemented to be distributed to an electronic device 101 of FIG. 1 and an external electronic device (e.g., a first external electronic device 1102, a second external electronic device 1104, or a server 1106 of FIG. 11) according to a role, a function, or performance of the secure circuitry 120.

Although not illustrated, according to various embodiments, the application module 510, the management module 520, the execution module 530, the authentication module 540, and the storage module 550 may be included in a plurality of processors (or chips). For example, the management module 520 and the execution module 530 may be included in a first processor (or a first chip). The application module 510 may be included in a second processor (or a second chip). Further, the authentication module 540 and the storage module 550 may be included in a third processor (or a third chip).

According to various embodiments, at least part of the secure circuitry 120 may be implemented with software, firmware, hardware, or two or more combinations thereof. At least part of the secure circuitry 120 may be implemented (e.g., executed) by, for example, a processor (e.g., a processor 110 of FIG. 1). At least part of the secure circuitry 120 may include, for example, a module, a program, a routine, sets of instructions, a process, or the like for performing one or more functions.

Figure 6:
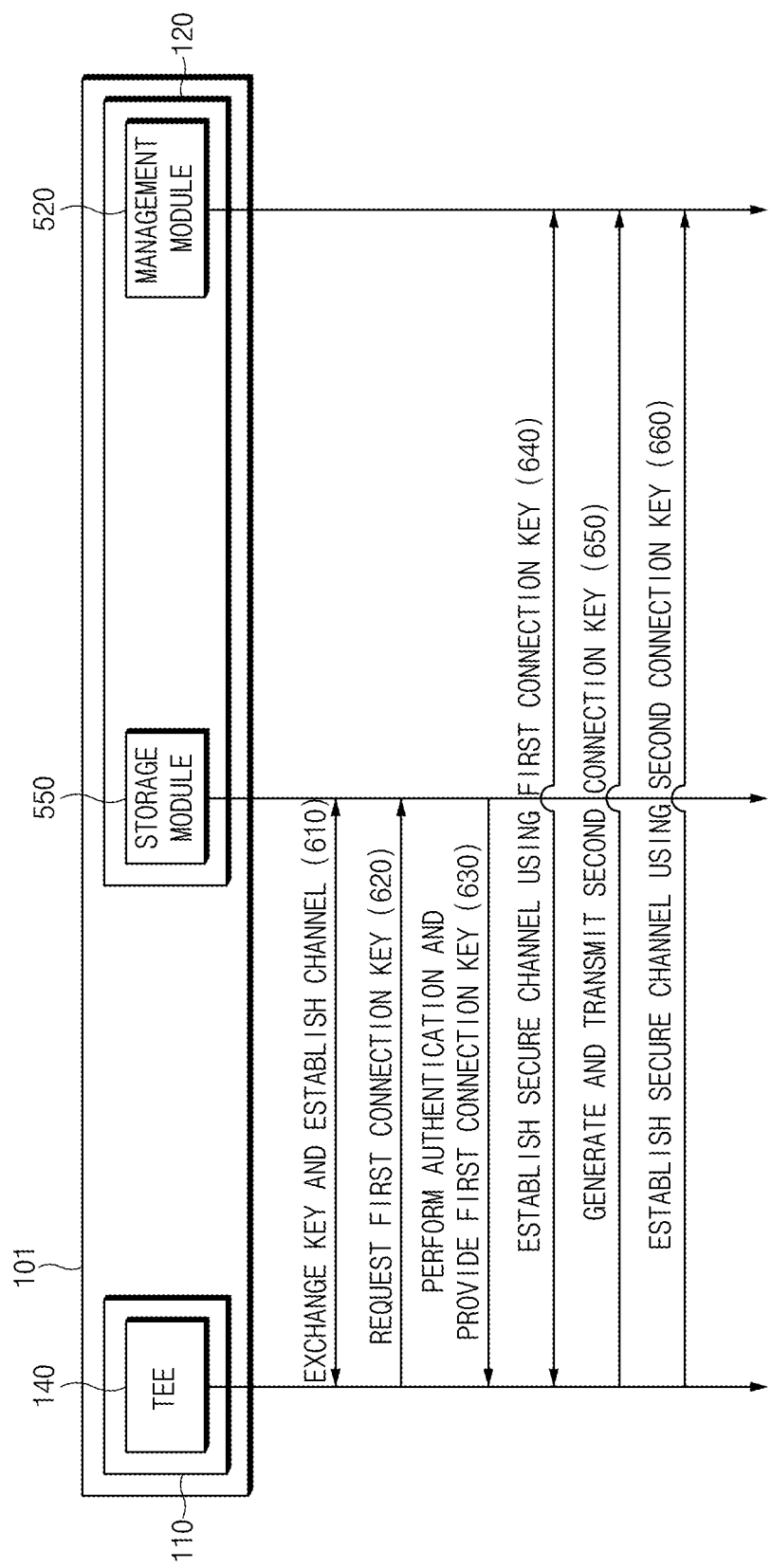
FIG. 6 is a signal sequence diagram illustrating a method for establishing a channel with a management module according to various embodiments of the present disclosure.

FIG. 6 is a signal sequence diagram illustrating a method for establishing a channel with a management module according to various embodiments of the present disclosure.

Referring to FIG. 6, in operation 610, an electronic device 101 (e.g., a TEE 140 of a processor 110) may establish a secure channel with a secure circuitry 120 through a provisioning process.

The TEE 140 may transmit, for example, a key exchange request to the secure circuitry 120. The key exchange request may include an algorithm identifier, a process identifier, a public key according to a specified secure algorithm, or the like.

The storage module 540 of the secure circuitry 120 may transmit, for example, a key exchange response to a TEE 140. If it succeeds in generating and storing a key, the key exchange response may include a success code. If it fails in generating and storing the key, the key exchange response may include an error code.

After the secure channel is established, the TEE 140 and the storage module 540 may transmit and receive data through a specified secure communication protocol.

In operation 620, the TEE 140 may request, for example, the storage module 550 to provide a first connection key for accessing the management module 520. The storage module 550 may be configured to store the first connection key for accessing the management module 520 at a time when the secure circuitry 120 is manufactured.

In operation 630, for example, if an authentication process for the TEE 140 is completed, the electronic device 101 (e.g., the storage module 550) may provide the stored first connection key to the TEE 140.

The authentication process may be a process of verifying whether the TEE 140 is a subject having access right to each storage information stored in the storage module 550. For example, the storage module 550 may provide storage information in any one of 1) if an identifier of a secure application (driven in the TEE 140) for requesting storage information is identical, 2) if an applet identifier of a secure element for requesting storage information is identical, or 3) if secret information (e.g., a password, fingerprint information, or the like) of a user who requests storage information.

In operation 640, the TEE 140 may establish, for example, a channel with the management module 520 using the first connection key.

In operation 650, the TEE 140 may generate, for example, a second connection key and may provide the second connection key to the management module 520 over a secure channel based on the first connection key.

In operation 660, the TEE 140 may establish, for example, a secure channel with the management module 520 using the second connection key. In various embodiments, after the secure channel using the second connection key is established, the TEE 140 may remove the first connection key from the TEE 140 to strengthen security.

According to various embodiments, the TEE 140 may provide a second public key 420a of FIG. 1 (e.g., any public key generated by an external device) associated with an encrypted secure program 410a to the secure circuitry 120 over the secure channel using the second connection key to proceed with a process of decrypting the encrypted secure program 410a.

According to various embodiments, the process of exchanging the first and second connection keys among the TEE 140, the storage module 550, and the management module 520 may be replaced with a key exchange process according to a specified protocol (e.g., a secure copy protocol (SCP)).

Figure 7A:
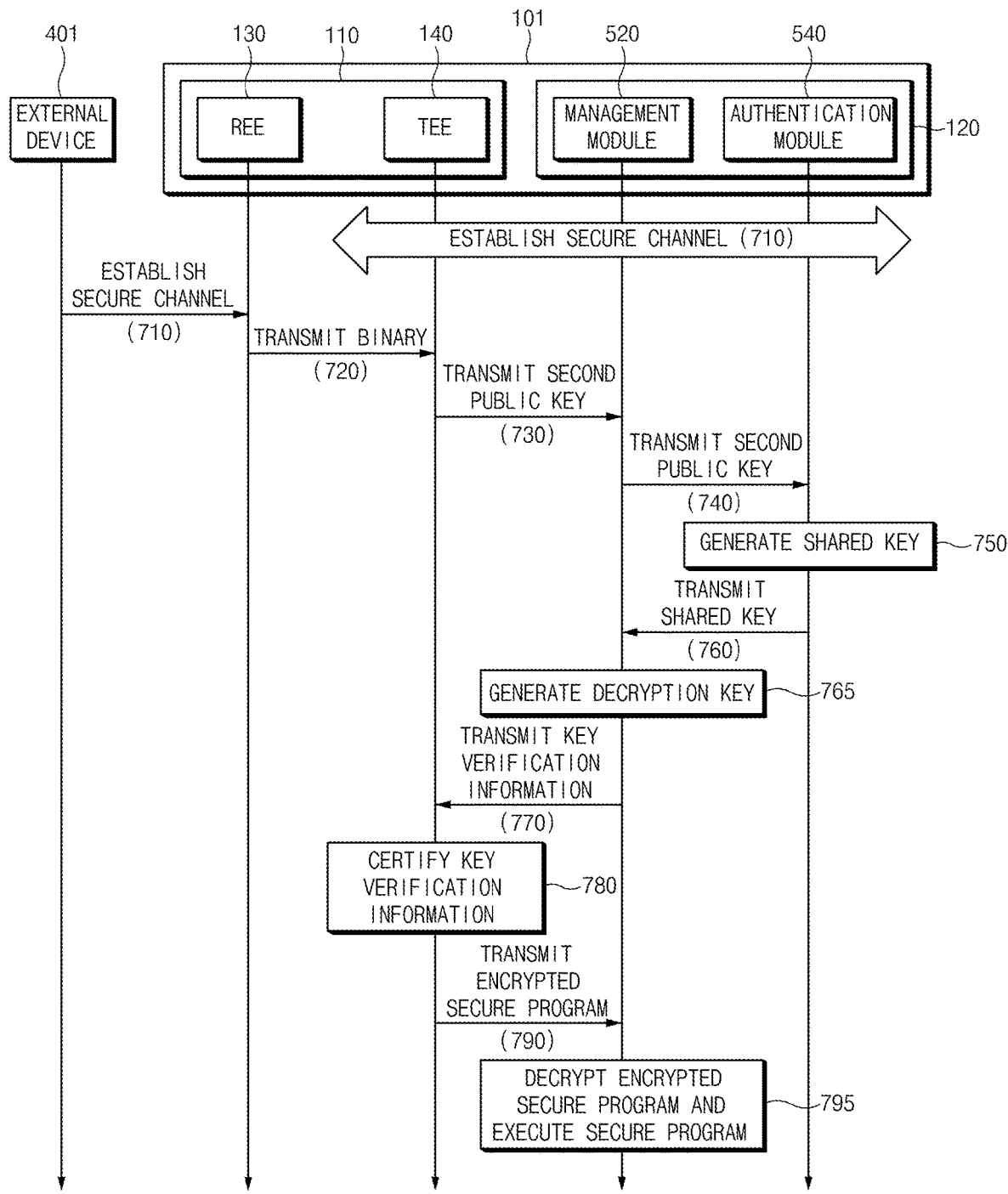
FIGS. 7A and 7B are a signal sequence diagram and a drawing illustrating a method for generating and certifying a shared key and a decryption key according to various embodiments of the present disclosure.
Figure 7B:
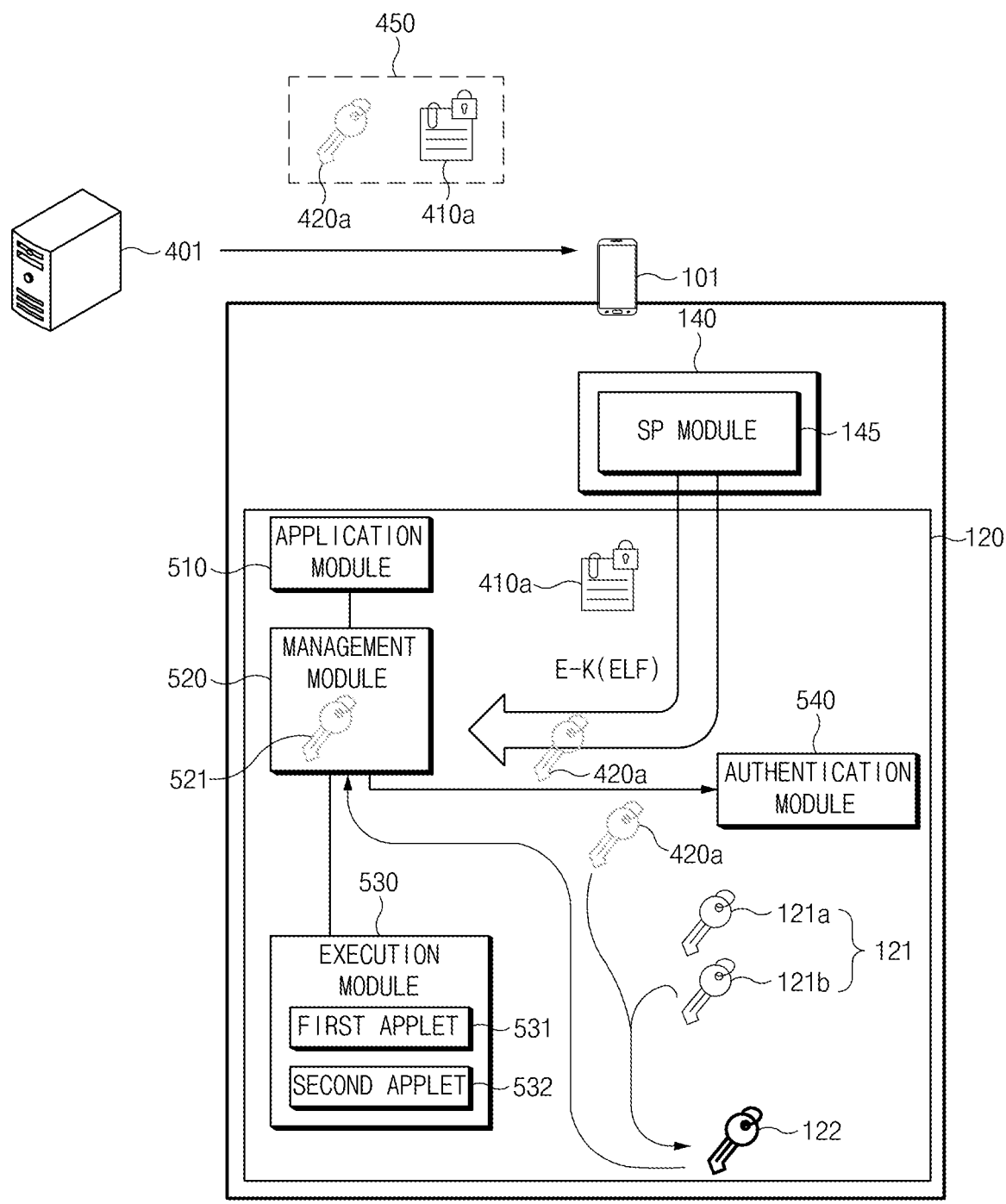

FIGS. 7A and 7B are a signal sequence diagram and a drawing illustrating a method for generating and certifying a shared key and a decryption key according to various embodiments of the present disclosure.

Referring to FIGS. 7A and 7B, a secure circuitry 120 may generate a shared key 122 (e.g., a shared key shared with an external device 401) using a second public key 420a (e.g., any public key generated by the external device 401) associated with an encrypted secure program 410a (e.g., an E_K(ELF)). The secure circuitry 120 may generate a decryption key 521 (e.g., a key for decrypting the encrypted secure program 410a) using the generated shared key 122.

In operation 710, a TEE 140 and a management module 520 may establish, for example, a secure channel. In various embodiments, the secure channel may be a secure channel using a second connection in FIG. 6.

In operation 720, an electronic device 101 (e.g., an REE 130) may receive, for example, a binary 450 (which may include key certification information and a second public key 420a) from an external device 401 and may transmit the received binary 450 to the TEE 140. The TEE 140 may certify a signature of the binary 450 and may extract the second public key 420a (e.g., any public key generated by the external device 401).

In operation 730, the electronic device 101 (e.g., the TEE 140) may provide, for example, the second public key 420a to the management module 520 over the secure channel.

In operation 740, the management module 520 may provide, for example, the second public key 420a to an authentication module 540.

In operation 750, the electronic device 101 (e.g., the authentication module 540) may generate, for example, a shared key 122. The authentication module 540 may generate the shared key 122 using the received second public key 420a and a first private key 121b stored therein. The shared key 122 may be the same key as a shared key 430 generated in the external device 410 in FIGS. 4A and 4B. The authentication module 540 may generate the shared key 122 by combining the received second public key 420a with the first private key 121b. Reference element 121 represents the first public key 121a and the first private key 121b, as illustrated in FIG. 7B.

In operation 760, the electronic device 101 (e.g., the authentication module 540) may transmit, for example, the generated shared key 122 to the management module 520.

In operation 765, the electronic device 101 (e.g., the management module 520) may generate, for example, a decryption key 521 using the shared key 122 and may store the shared key 122 and the decryption key 521.

In operation 770, the electronic device 101 (e.g., the management module 520) may transmit, for example, key verification information to the TEE 140.

In operation 780, the electronic device 101 (e.g., the TEE 140) may compare, for example, the key verification information with key certification information included in the binary 450 to verify whether the shared key 122 is validly generated (e.g., whether the shared key 122 is identical to the shared key 430 used for encrypting a secure program at the external device 410).

In operation 790, if verifying that the shared key 122 is valid, the electronic device 101 (e.g., the TEE 140) may transmit, for example, the encrypted secure program 410a to the management module 520.

In operation 795, the management module 520 may decrypt and execute, for example, the secure program using the decryption key 521. For example, a first applet 531 and a second applet 532 may be installed in the execution module 530 of the secure circuitry 120.

Figure 8:
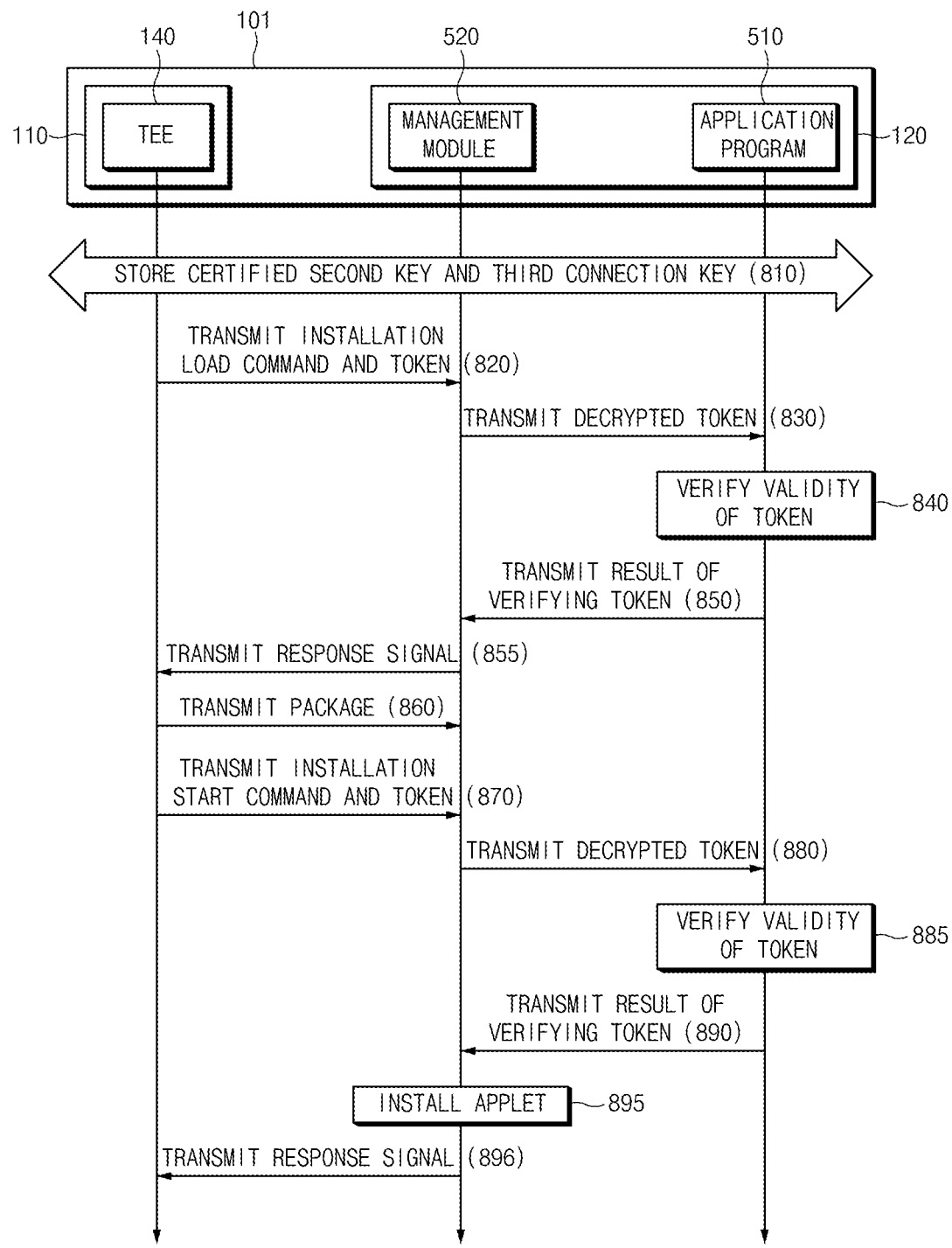
FIG. 8 is a signal sequence diagram illustrating a method for decrypting a secure program and installing an applet according to various embodiments of the present disclosure.

FIG. 8 is a signal sequence diagram illustrating a method for decrypting a secure program and installing an applet according to various embodiments of the present disclosure.

Referring to, FIG. 8, an embodiment is exemplified as an applet is installed. However, embodiments are not limited thereto. For example, embodiments may be applied if an applet is deleted or updated.

Referring to FIG. 8, in operation 810, a management module 520 may store, for example, a shared key and a decryption key, key certification of which is completed.

In operation 820, a TEE 140 may provide, for example, an installation load command of an applet and a token to the management module 520 in an encrypted form.

In operation 830, the management module 520 may decrypt, for example, the installation load command and the token using a stored decryption key. The management module 520 may provide the token to an application module 510.

In operation 840, the application module 510 may verify, for example, validity of the received token (e.g., verify the validity of the token using a token verification key). In various embodiments, if the token is valid, the application module 510 may generate a response signal (e.g., generate a signal using a receipt generation key).

In operation 850, the application module 510 may transmit, for example, the result of verifying the token to the management module 520.

In operation 855, the management module 520 may transmit a response signal to the TEE 140 depending on the result of verifying the token.

In operation 860, the TEE 140 may transmit a package for installing an applet to the management module 520. In various embodiments, the management module 520 may store the package and may transmit a response signal to storing the package to the TEE 140.

In operation 870, the TEE 140 may transmit, for example, an installation start command and a token to the management module 520.

In operation 880, the management module 520 may decrypt, for example, the installation start command and the token using a stored decryption key and may provide the decrypted token to the application module 510.

In operation 885, the application module 510 may verify, for example, validity of the received token (e.g., verify the validity of the token using a token verification key). In various embodiments, if the token is valid, the application module 510 may generate a response signal (e.g., generate a signal using a receipt generation key).

In operation 890, the application module 510 may transmit, for example, the result of verifying the token to the management module 520.

In operation 895, the management module 520 may install, for example, an applet.

After the installation of the applet is completed, in operation 896, the management module 520 may transmit a response signal to the TEE 140.

According to various embodiments, the TEE 140 may install an installation program configured with a plurality of packages (e.g., packet 1, packet 2, . . . , package N, and the like) in a secure circuitry 120. The TEE 140 may transmit the plurality of packages sequentially or randomly. In various embodiments, the management module 520 may store respective packages and may transmit a response signal to storing the respective packets to the TEE 140. Operations 820 to 890 may be performed for each of the plurality of packages. If storage and certification for each of the plurality of packages are completed, the management module 520 may install an applet.

According to various embodiments, a process of deleting a previous apple may progress before the process of installing the applet. The process of deleting the applet may progress in the form of being similar to, for example, operations 810 to 850.

The TEE 140 may provide a deletion command of an applet and a token to the management module 520 in the form of being encrypted. The management module 520 may decrypt the deletion command and the token using a stored decryption key. The management module 520 may provide the token to the application module 510. The application module 510 may verify validity of the received token (e.g., verify the validity of the token using a token verification key). The application module 510 may provide the result of verifying the token and a response signal to the management module 520. The management module 520 may transmit a deletion response signal to the TEE 140.

Figure 9:
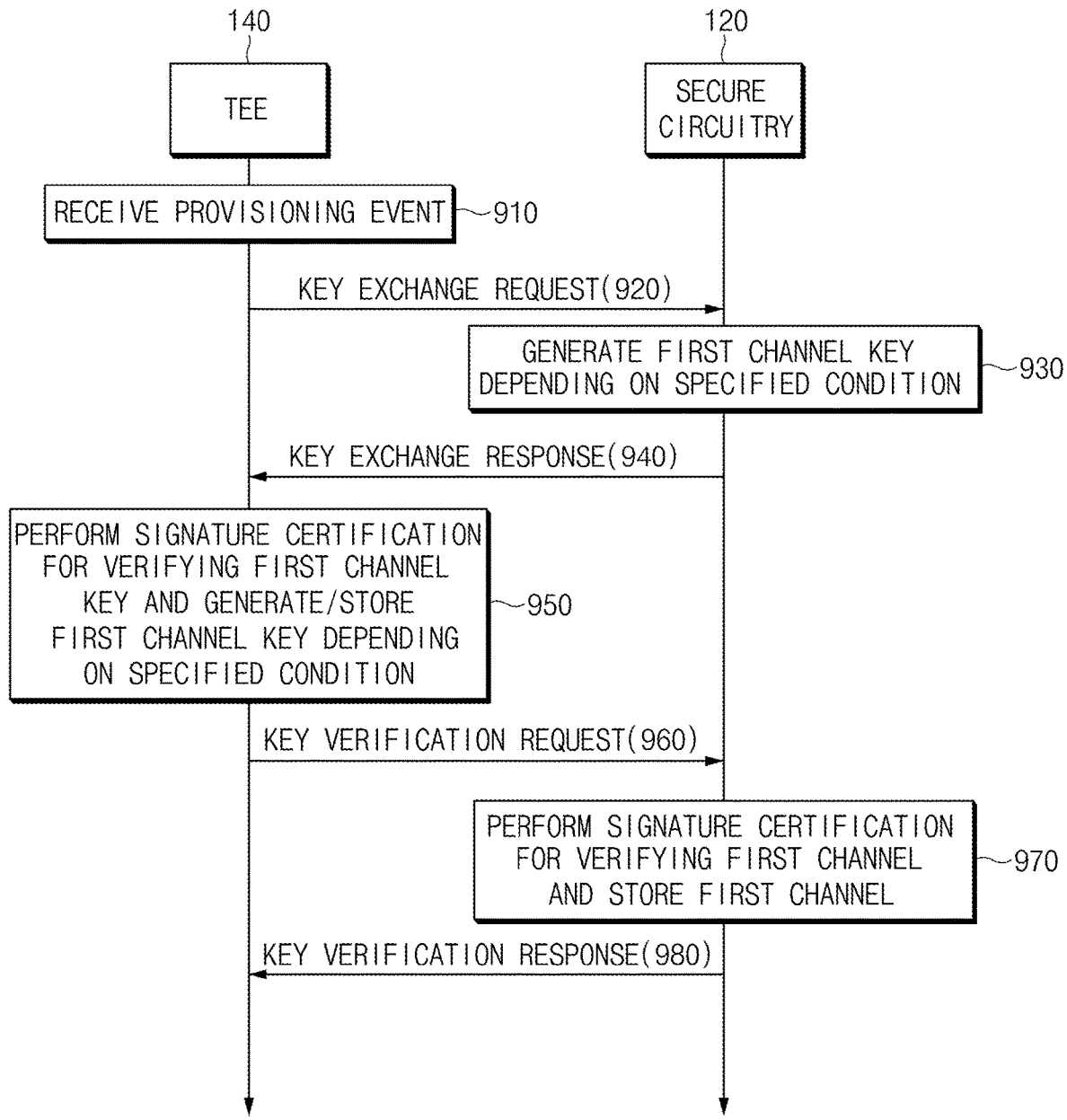
FIG. 9 is a signal sequence diagram illustrating a provisioning method of a secure circuitry according to various embodiments of the present disclosure.

FIG. 9 is a signal sequence diagram illustrating a provisioning method of a secure circuitry according to various embodiments of the present disclosure. A provisioning process may be a process of sharing a channel key between a TEE 140 and a secure circuitry 120.

Referring to FIG. 9, in operation 910, for example, the TEE 140 may receive a provisioning event. The provisioning event may be a start signal for starting the provisioning process. In various embodiments, the provisioning event may be an event for receiving a provisioning request from an external device. The provisioning request may be an ATtension (AT) command of a key generation and management device or an OTA message of an external server having the right to manage the secure circuitry 120.

According to various embodiments, the provisioning event may be a specified event generated in an electronic device 101 of FIG. 1. For example, the provisioning event may be at least one of if the secure circuitry 120 does not store a key when the electronic device 101 is booted, if there is no history where a flag indicating history information in which provisioning is performed is checked when the electronic device 101 is booted, or if a key is not stored when a connection request is made by receiving a use request of the secure circuitry 120.

For example, if the secure circuitry 120 has a channel in advance, the TEE 140 may end a provisioning procedure. If the secure circuitry 120 does not have the channel key, the TEE 140 may proceed with a provisioning procedure of operations 920 to 980.

In operation 920, the TEE 140 may transmit, for example, a key exchange request to the secure circuitry 120 depending on the provisioning event. In various embodiments, the key exchange request may include an algorithm identifier, a process identifier, a public key according to a specified secure algorithm, or the like.

In operation 930, the secure circuitry 120 may verify, for example, a specified condition (e.g., information indicating whether there is a stored key, state information of the secure circuitry 120, or the like) and may generate a first channel depending on the specified condition. For example, if there is no predetermined channel key and if the secure circuitry 120 is not in a blocked state or terminated state, the secure circuitry 120 may generate the first channel key. In various embodiments, if the secure circuitry 120 is in the blocked state or the terminated state, it may transmit an error code to the TEE 140. Information about the condition may be provided with reference to FIG. 10. In various embodiments, the secure circuitry 120 may calculate a KDF based on a private key of the secure circuitry 120 and a public key, a processor identifier, a secure circuitry identifier, or the like of the TEE 140 and may generate a key using the calculated KDF.

In operation 940, the secure circuitry 120 may transmit, for example, a key exchange response to the TEE 140. If it succeeds in generating a key, the key exchange response may include a success code. If it fails in generating the key, the key exchange response may include an error code. In various embodiments, the secure circuitry 120 may transmit a key (e.g., a public key) generated to exchange a key with the TEE 140 and MAC data as a response. The secure circuitry 120 may sign using a private key of the secure circuitry 120 to certify data integrity and transmit the response.

In operation 950, the TEE 140 may operate in response to, for example, the key exchange response. If receiving the success code, the TEE 140 may perform signature certification for verifying a first channel key and calculate a private key of the secure circuitry 120 and a public key, a processor identifier, a secure circuitry identifier, or the like of the TEE 140 as factors, thus generating and storing the first channel key using the calculated factors.

On the other hand, if receiving the error code, the TEE 140 may verify the reason that it fails in generating and storing a key (e.g., that a key exists in advance, that the secure circuitry 120 is in a blocked state, or the like). The TEE 140 may perform an operation corresponding to each error code (e.g., waiting, re-execution, reset, notification using at least one or more of a sound or a display, or the like).

In various embodiments, the TEE 140 may compare MAC data transmitted from the secure circuitry 120 with MAC data directly generated by the TEE 140 to verify validity of a key generated by each element. An operation similar to (or corresponding to) the above-mentioned operation may be performed by the secure circuitry 120 (operation 970). In various embodiments, if receiving a response signed using a private key of the secure circuitry 120, the TEE 140 may certify a signature using a public key corresponding to a private key of the secure circuitry 120.

For example, after the generation and storage of the key is completed, in operation 960, the TEE 140 may transmit a key verification request to the secure circuitry 120 using MAC data. In various embodiments, the TEE 140 may sign using a private key of the TEE 140 to certify integrity of data and may transmit a key verification request to the secure circuitry 120.

In operation 970, the secure circuitry 120 may perform signature certification for verifying a first channel key. If the certification is valid, the secure circuitry 120 may store the first channel key generated in operation 930. The secure circuitry 120 may compare, for example, transmitted MAC data with directly generated MAC data to verify validity of a generated key. In this case, the secure circuitry 120 may certify a signature using a public key corresponding to a private key of the TEE 140 in a similar manner to the above-mentioned manner.

In operation 980, the secure circuitry 120 may transmit, for example, a key verification response depending on the compared result.

Figure 10:
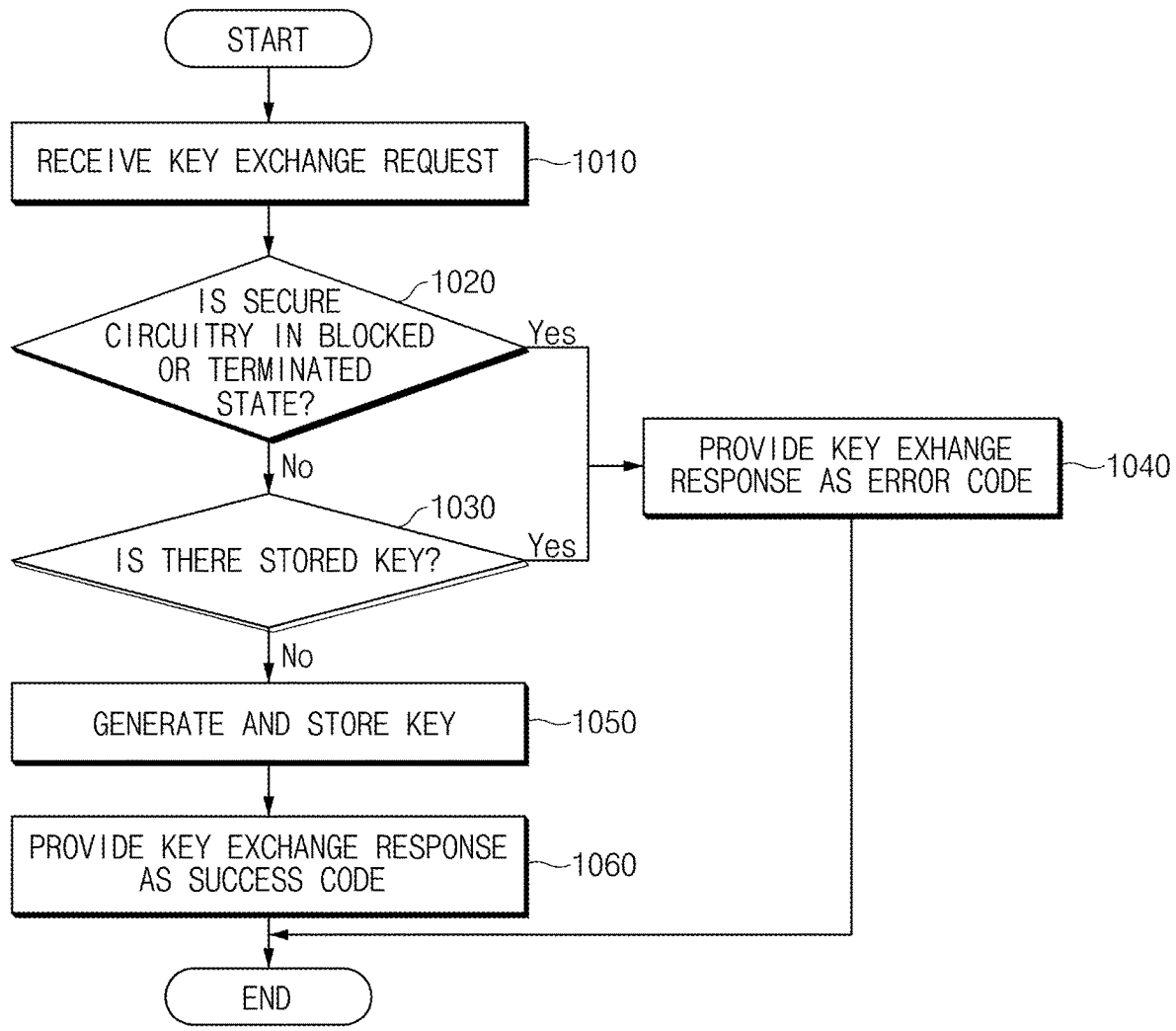
FIG. 10 is a flowchart illustrating a method for generating a key in a secure circuitry according to various embodiments of the present disclosure.

FIG. 10 is a flowchart illustrating a method for generating a key in a secure circuitry according to various embodiments of the present disclosure.

Referring to FIG. 10, in operation 1010, a secure circuitry 120 of FIG. 2 may receive, for example, a key exchange request from a TEE 140 of FIG. 2. The key exchange request may include an algorithm identifier, a process identifier, a public key according to a specified secure algorithm, or the like.

In operation 1020, the secure circuitry 120 may determine whether the secure circuitry 120 is in, for example, a blocked state or a terminated state. The blocked state may be a state where a reset process of the secure circuitry 120 fails a specified number (e.g., 5 times) or more. The terminated state may be a state where an operation of the secure circuitry 120 is terminated by a critical attack (e.g., a physical attack or the like).

In operation 1030, for example, if the secure circuitry 120 is not in the blocked state or the terminated state, it may determine whether there is a previously stored channel key.

As a result of the comparison or determination in operation 1020 or 1030, if the secure circuitry 120 is in the blocked or terminated state or if there is a previous key (e.g., a channel key), the secure circuitry 120 may perform, for example, operation 1040. According to an embodiment, in operation 1040, the secure circuitry 120 may provide a key exchange response as an error code to the TEE 140. In various embodiments, operations 1020 and 1030 may be simultaneously progress or may be changed in order.

As a result of the comparison or determination in operation 1020 or 1030, if the secure circuitry 120 is not in the blocked or terminated state or if there is no stored key (e.g., the channel key), the secure circuitry 120 may perform, for example, operation 1050. According to an embodiment, in operation 1050, the secure circuitry 120 may generate and store, for example, a channel key. The secure circuitry 120 may calculate a KDF based on a private key of the secure circuitry 120 and a public key, a processor identifier, a secure circuitry identifier, or the like of the TEE 140 and may generate and store a key using the calculated KDF.

In operation 1060, the secure circuitry 120 may provide, for example, a key exchange response as a success code to the TEE 140.

Operations (e.g., operations 301 to 305, operations 411 to 417, operations 610 to 660, operations 710 to 795, operations 810 to 896, operations 910 to 980, or operations 1010 to 1060) described in the process and method shown in FIGS. 3, 4, and 6 to 10 may be executed sequentially, in parallel, repeatedly, or in a heuristic method. For example, some operations may be executed in different sequences or may be omitted. Alternatively, other operations may be added.

According to various embodiments, a program management method may be performed in an electronic device including a processor, a memory, a communication interface, and a secure circuitry. The method includes receiving, by the processor, a first public key uniquely stored in the secure circuitry, transmitting, by the processor, the first public key to an external device via the communication interface, receiving, by the processor, a secure program encrypted based on the first public key and a second public key generated by the external device, through the communication interface from the external device, transmitting, by the processor, the second public key and the encrypted secure program to the secure circuitry to the secure circuitry, and decrypting, by the secure circuitry, the encrypted secure program based on the second public key and a first private key which is symmetrical to the first public key.

According to various embodiments, the receiving of the first public key comprises establishing a secure channel between a TEE of the processor and the secure circuitry, and receiving, by the processor, the first public key over the secure channel.

According to various embodiments, the decrypting of the encrypted secure program comprises generating, by the secure circuitry, a shared key shared with the external device using the second public key and the first private key, and decrypting, by the secure circuitry, the secure program using a decryption key generated using the shared key.

According to various embodiments, the generating of the shared key comprises generating, by the secure circuitry, key verification information for verifying validity of the generated shared key, receiving, by the processor, the key verification information from the secure circuitry, and determining, by the processor, validity of the shared key based on the key verification information.

Figure 11:
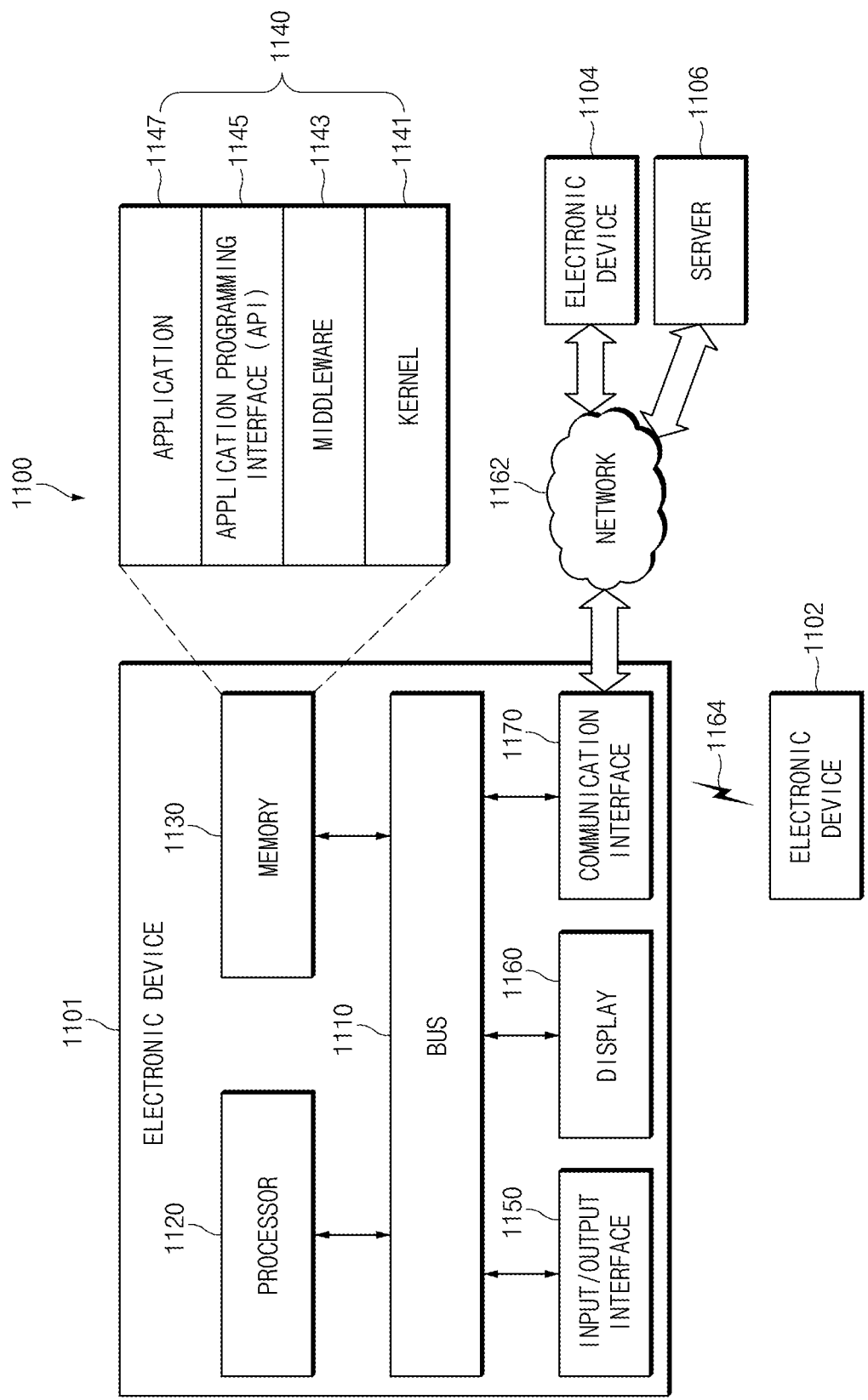
FIG. 11 is a block diagram illustrating a configuration of a network environment system according to various embodiments of the present disclosure.

FIG. 11 illustrates an electronic device in a network environment according to an embodiment of the present disclosure.

Referring to FIG. 11, an electronic device 1101 in a network environment 1100 according to various embodiments of the present disclosure will be described with reference to FIG. 11. The electronic device 1101 may include a bus 1110, a processor 1120 (e.g., at least one processor), a memory 1130 (e.g., a storage), an input/output interface 1150, a display 1160, and a communication interface 1170. In various embodiments of the present disclosure, at least one of the foregoing elements may be omitted or another element may be added to the electronic device 1101.

The bus 1110 may include a circuit for connecting the above-mentioned elements 1110 to 1170 to each other and transferring communications (e.g., control messages and/or data) among the above-mentioned elements.

The processor 1120 may include at least one of a central processing unit (CPU), an application processor (AP), or a communication processor (CP). The processor 1120 may perform data processing or an operation related to communication and/or control of at least one of the other elements of the electronic device 1101.

The memory 1130 may include a volatile memory and/or a nonvolatile memory. The memory 1130 may store instructions or data related to at least one of the other elements of the electronic device 1101. According to an embodiment of the present disclosure, the memory 1130 may store software and/or a program 1140. The program 1140 may include, for example, a kernel 1141, a middleware 1143, an application programming interface (API) 1145, and/or an application program (or an application) 1147. At least a portion of the kernel 1141, the middleware 1143, or the API 1145 may be referred to as an operating system (OS).

The kernel 1141 may control or manage system resources (e.g., the bus 1110, the processor 1120, the memory 1130, or the like) used to perform operations or functions of other programs (e.g., the middleware 1143, the API 1145, or the application program 1147). Furthermore, the kernel 1141 may provide an interface for allowing the middleware 1143, the API 1145, or the application program 1147 to access individual elements of the electronic device 1101 in order to control or manage the system resources.

The middleware 1143 may serve as an intermediary so that the API 1145 or the application program 1147 communicates and exchanges data with the kernel 1141.

Furthermore, the middleware 1143 may handle one or more task requests received from the application program 1147 according to a priority order. For example, the middleware 1143 may assign at least one application program 1147 a priority for using the system resources (e.g., the bus 1110, the processor 1120, the memory 1130, or the like) of the electronic device 1101. For example, the middleware 1143 may handle the one or more task requests according to the priority assigned to the at least one application, thereby performing scheduling or load balancing with respect to the one or more task requests.

The API 1145, which is an interface for allowing the application 1147 to control a function provided by the kernel 1141 or the middleware 1143, may include, for example, at least one interface or function (e.g., instructions) for file control, window control, image processing, character control, or the like.

The input/output interface 1150 may serve to transfer an instruction or data input from a user or another external device to (an)other element(s) of the electronic device 1101. Furthermore, the input/output interface 1150 may output instructions or data received from (an)other element(s) of the electronic device 1101 to the user or another external device.

The display 1160 may include, for example, a liquid crystal display (LCD), a light-emitting diode (LED) display, an organic light-emitting diode (OLED) display, a micro-electromechanical systems (MEMS) display, or an electronic paper display. The display 1160 may present various content (e.g., a text, an image, a video, an icon, a symbol, or the like) to the user. The display 1160 may include a touch screen, and may receive a touch, gesture, proximity or hovering input from an electronic pen or a part of a body of the user.

The communication interface 1170 may set communications between the electronic device 1101 and an external device (e.g., a first external electronic device 1102, a second external electronic device 1104, or a server 1106). For example, the communication interface 1170 may be connected to a network 1162 via wireless communications or wired communications so as to communicate with the external device (e.g., the second external electronic device 1104 or the server 1106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communication 1164. The short-range communications may include at least one of Wi-Fi, Bluetooth, near field communication (NFC), magnetic stripe transmission (MST), or GNSS.

The MST may generate pulses according to transmission data and the pulses may generate electromagnetic signals. The electronic device 1101 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 1162 may include at least one of telecommunications networks, for example, a computer network (e.g., local area network (LAN) or wide area network (WAN)), the Internet, or a telephone network.

The types of the first external electronic device 1102 and the second external electronic device 1104 may be the same as or different from the type of the electronic device 1101. According to an embodiment of the present disclosure, the server 1106 may include a group of one or more servers. A portion or all of operations performed in the electronic device 1101 may be performed in one or more other electronic devices (e.g., the first electronic device 1102, the second external electronic device 1104, or the server 1106). When the electronic device 1101 should perform a certain function or service automatically or in response to a request, the electronic device 1101 may request at least a portion of functions related to the function or service from another device (e.g., the first electronic device 1102, the second external electronic device 1104, or the server 1106) instead of or in addition to performing the function or service for itself. The other electronic device (e.g., the first electronic device 1102, the second external electronic device 1104, or the server 1106) may perform the requested function or additional function, and may transfer a result of the performance to the electronic device 1101. The electronic device 1101 may use a received result itself or additionally process the received result to provide the requested function or service. To this end, for example, a cloud computing technology, a distributed computing technology, or a client-server computing technology may be used.

Figure 12:
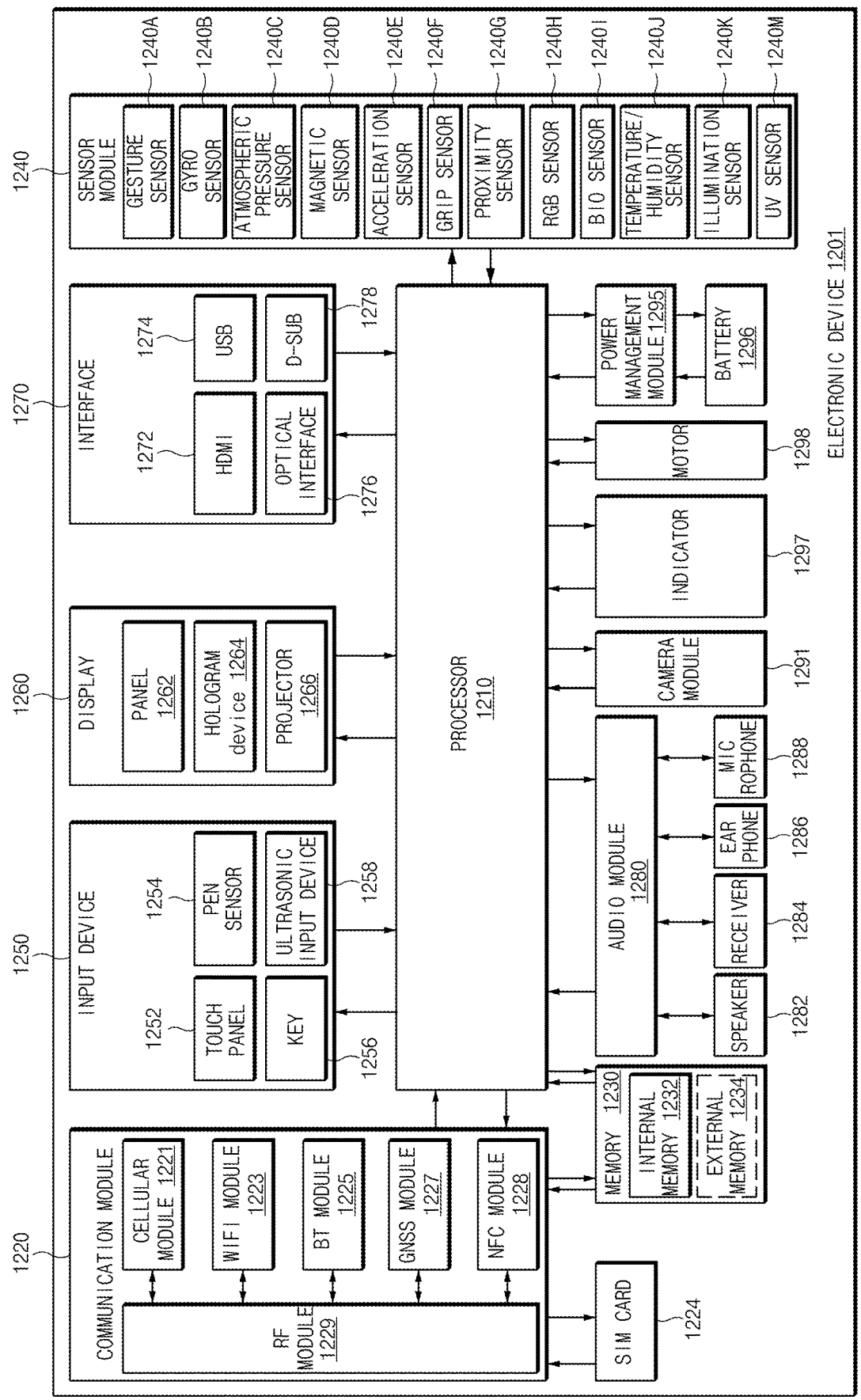
FIG. 12 is a block diagram illustrating a configuration of an electronic device according to various embodiments of the present disclosure.

FIG. 12 is a block diagram illustrating an electronic device according to various embodiments of the present disclosure.

Referring to FIG. 12, an electronic device 1201 may include, for example, a part or the entirety of the electronic device 1101 illustrated in FIG. 11. The electronic device 1201 may include at least one processor (e.g., AP) 1210, a communication module 1220, a subscriber identification module (SIM) 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may run an operating system or an application program so as to control a plurality of hardware or software elements connected to the processor 1210, and may process various data and perform operations. The processor 1210 may be implemented with, for example, a system on chip (SoC). According to an embodiment of the present disclosure, the processor 1210 may further include a graphic processing unit (GPU) and/or an image signal processor. The processor 1210 may include at least a portion (e.g., a cellular module 1221) of the elements illustrated in FIG. 12. The processor 1210 may load, on a volatile memory, an instruction or data received from at least one of other elements (e.g., a nonvolatile memory) to process the instruction or data, and may store various data in a nonvolatile memory.

The communication module 1220 may have a configuration that is the same as or similar to that of the communication interface 1170 of FIG. 11. The communication module 1220 may include, for example, a cellular module 1221, a Wi-Fi module 1223, a Bluetooth (BT) module 1225, a GNSS module 1227 (e.g., a GPS module, a GLONASS module, a BeiDou module, or a Galileo module), a NFC module 1228, and a radio frequency (RF) module 1229.

The cellular module 1221 may provide, for example, a voice call service, a video call service, a text message service, or an Internet service through a communication network. The cellular module 1221 may identify and authenticate the electronic device 1201 in the communication network using the subscriber identification module 1224 (e.g., a SIM card). The cellular module 1221 may perform at least a part of functions that may be provided by the processor 1210. The cellular module 1221 may include a communication processor (CP).

Each of the Wi-Fi module 1223, the Bluetooth module 1225, the GNSS module 1227 and the NFC module 1228 may include, for example, a processor for processing data transmitted/received through the modules. According to some various embodiments of the present disclosure, at least a part (e.g., two or more) of the cellular module 1221, the Wi-Fi module 1223, the Bluetooth module 1225, the GNSS module 1227, and the NFC module 1228 may be included in a single integrated chip (IC) or IC package.

The RF module 1229 may transmit/receive, for example, communication signals (e.g., RF signals). The RF module 1229 may include, for example, a transceiver, a power amp module (PAM), a frequency filter, a low noise amplifier (LNA), an antenna, or the like. According to another embodiment of the present disclosure, at least one of the cellular module 1221, the Wi-Fi module 1223, the Bluetooth module 1225, the GNSS module 1227, or the NFC module 1228 may transmit/receive RF signals through a separate RF module.

The SIM 1224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1230 (e.g., the memory 1130) may include, for example, an internal memory 1232 or an external memory 1234. The internal memory 1232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1234 may include a flash drive such as a compact flash (CF), a secure digital (SD), a Micro-SD, a Mini-SD, an extreme digital (xD), a MultiMediaCard (MMC), a memory stick, or the like. The external memory 1234 may be operatively and/or physically connected to the electronic device 1201 through various interfaces.

The sensor module 1240 may, for example, measure physical quantity or detect an operation state of the electronic device 1201 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., a red/green/blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1240 may further include a control circuit for controlling at least one sensor included therein. In some various embodiments of the present disclosure, the electronic device 1201 may further include a processor configured to control the sensor module 1240 as a part of the processor 1210 or separately, so that the sensor module 1240 is controlled while the processor 1210 is in a sleep state.

The input device 1250 may include, for example, a touch panel 1252, a (digital) pen sensor 1254, a key 1256, or an ultrasonic input device 1258. The touch panel 1252 may employ at least one of capacitive, resistive, infrared, and ultraviolet sensing methods. The touch panel 1252 may further include a control circuit. The touch panel 1252 may further include a tactile layer so as to provide a haptic feedback to a user.

The (digital) pen sensor 1254 may include, for example, a sheet for recognition which is a part of a touch panel or is separate. The key 1256 may include, for example, a physical button, an optical button, or a keypad. The ultrasonic input device 1258 may sense ultrasonic waves generated by an input tool through a microphone 1288 so as to identify data corresponding to the ultrasonic waves sensed.

The display 1260 (e.g., the display 1160) may include a panel 1262, a hologram device 1264, or a projector 1266. The panel 1262 may have a configuration that is the same as or similar to that of the display 1160 of FIG. 11. The panel 1262 may be, for example, flexible, transparent, or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be disposed in the inside or the outside of the electronic device 1201. According to an embodiment of the present disclosure, the display 1260 may further include a control circuit for controlling the panel 1262, the hologram device 1264, or the projector 1266.

The interface 1270 may include, for example, an HDMI 1272, a USB 1274, an optical interface 1276, or a D-subminiature (D-sub) 1278. The interface 1270, for example, may be included in the communication interface 1170 illustrated in FIG. 11. Additionally or alternatively, the interface 1270 may include, for example, a mobile high-definition link (MHL) interface, an SD card/MMC interface, or an infrared data association (IrDA) interface.

The audio module 1280 may convert, for example, a sound into an electrical signal or vice versa. At least a portion of elements of the audio module 1280 may be included in the input/output interface 1150 illustrated in FIG. 11. The audio module 1280 may process sound information input or output through a speaker 1282, a receiver 1284, an earphone 1286, or the microphone 1288.

The camera module 1291 is, for example, a device for shooting a still image or a video. According to an embodiment of the present disclosure, the camera module 1291 may include at least one image sensor (e.g., a front sensor or a rear sensor), a lens, an image signal processor (ISP), or a flash (e.g., an LED or a xenon lamp).

The power management module 1295 may manage power of the electronic device 1201. According to an embodiment of the present disclosure, the power management module 1295 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, or the like. The motor 1298 may convert an electrical signal into a mechanical vibration, and may generate a vibration or haptic effect. Although not illustrated, a processing device (e.g., a GPU) for supporting a mobile TV may be included in the electronic device 1201. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments, an electronic device includes a communication interface configured to communicate with an external device, a memory, a processor, and a secure circuitry configured to be connected with the processor over a secure channel, wherein the secure circuitry is configured to provide a first public key stored in the secure circuitry to the processor, wherein the processor is configured to transmit the first public key to the external device via the communication interface, receive a secure program encrypted based on the first public key and a second public key generated by the external device, via the communication interface from the external device, and transmit the second public key and the encrypted secure program to the secure circuitry, wherein the secure circuitry is configured to decrypt the encrypted secure program based on the second public key and a first private key which is symmetrical to the first public key.

According to various embodiments, the processor is configured to operate by being divided into a rich execution environment (REE) and a trusted execution environment (TEE). The TEE is configured to establish the secure channel with the secure circuitry, and transmit and receive the first public key and data necessary for decrypting the secure program, over the secure channel.

According to various embodiments, the secure circuitry is configured to store the first public key and the first private key uniquely assigned to the secure circuitry when the secure circuitry is manufactured or at a time when the secure circuitry is mounted on the electronic device.

According to various embodiments, the encrypted secure program is encrypted based on a second private key corresponding to the second public key and the first public key by the external device.

According to various embodiments, the encrypted secure program is encrypted using an encryption key uniquely assigned to the secure circuitry by the external device.

According to various embodiments, the secure circuitry is configured to generate a shared key shared with the external device using the second public key and the first private key, and decrypt the secure program using a decryption key generated using the shared key.

According to various embodiments, the secure circuitry is configured to transmit key verification information for verifying validity of the generated shared key to the processor, and the processor is configured to if the key verification information is valid, provide the encrypted secure program to the secure circuitry.

According to various embodiments, the TEE is configured to collect a first connection key previously stored in a storage module of the secure circuitry, and establish a first secure channel with a management module of the secure circuitry based on the first connection key.

According to various embodiments, the TEE is configured to generate a second connection key, and establish a second secure channel with the management module using the second connection key.

According to various embodiments, the second public key comprises a public key between asymmetric keys, randomly generated in the external device, used to encrypt the secure program.

According to various embodiments, the processor is configured to determine validity of the shared key by comparing key certification information stored together with the encrypted secure with the key verification information.

According to various embodiments, the processor is configured to receive the encrypted secure program and the key certification information form the external device.

According to various embodiments, the processor is configured to receive the second public key, the encrypted secure program, and the key certification information as a binary from the external device.

According to various embodiments, the TEE is configured to test suitability of a signature for the binary.

According to various embodiments, the secure circuitry is configured to perform at least one of deleting, installing, or updating at least one applet in the secure circuitry by executing the secure program.

According to various embodiments, a server device for communicating with an external electronic device, includes a communication interface, a memory, and a processor configured to be electrically connected with the communication interface and the memory, wherein the processor is configured to receive a first public key between the first public key and a second private key stored in a secure circuitry of the electronic device, generate a second public key and a second private key which are any asymmetric keys, generate a shared key shared with the secure circuitry, using the first public key and the second private key, encrypt a program to be executed in the secure circuitry, based on the shared key, and transmit the encrypted program and the second public key to the electronic device.

According to various embodiments, the processor is configured to generate a separate encryption key using the shared key, and encrypt the program using the encryption key.

Figure 13:
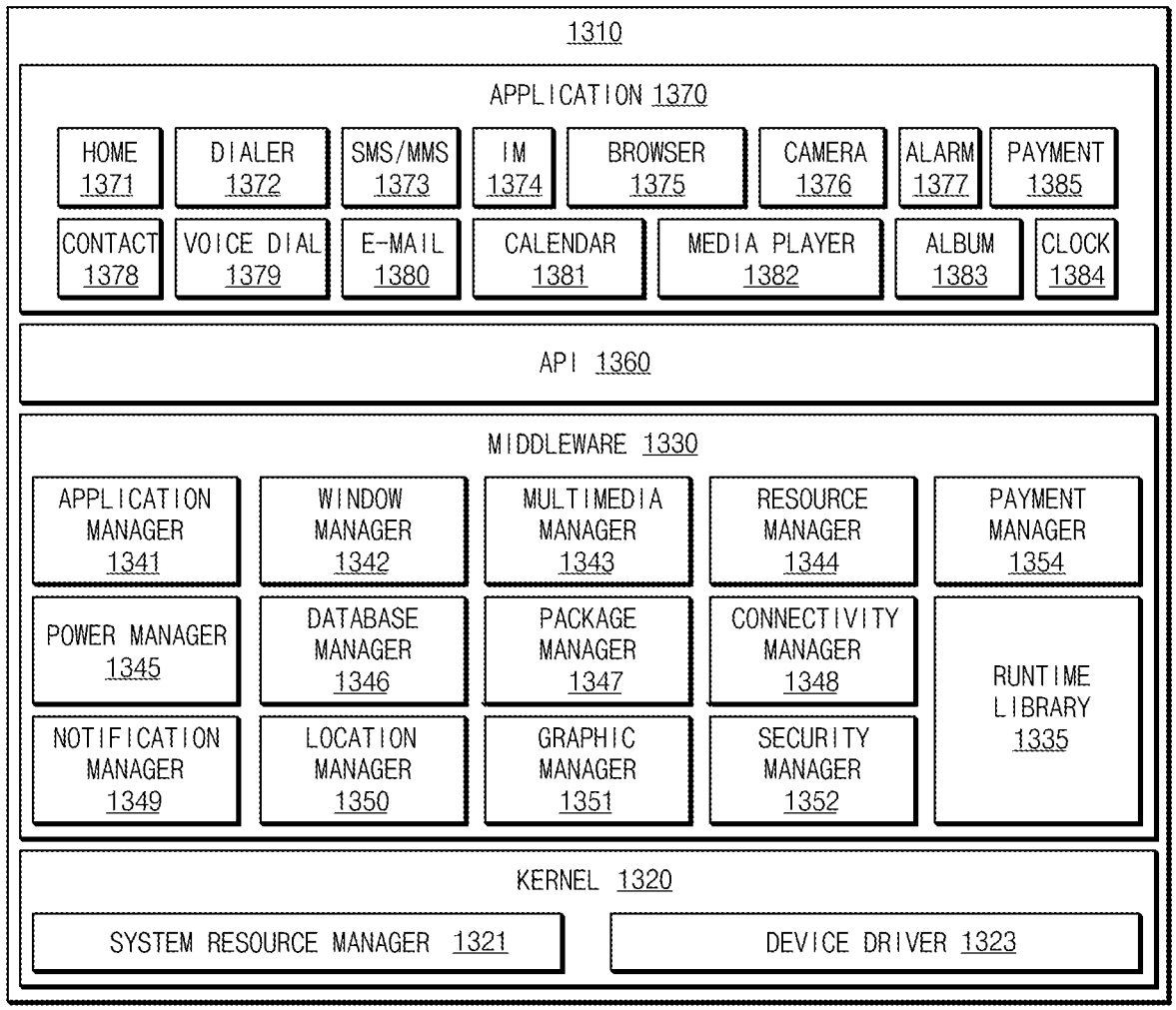
FIG. 13 is a block diagram illustrating a configuration of a program module according to various embodiments of the present disclosure.

FIG. 13 is a block diagram illustrating a program module according to various embodiments of the present disclosure.

Referring to FIG. 13, a program module 1310 (e.g., the program 1140) may include an operating system (OS) for controlling a resource related to an electronic device (e.g., the electronic device 1101) and/or various applications (e.g., the application program 1147) running on the OS. The operating system may be, for example, Android™, iOS™, Windows™, Symbian™, Tizen™, or the like.

The program module 1310 may include a kernel 1320, a middleware 1330, an API 1360, and/or an application 1370. At least a part of the program module 1310 may be preloaded on an electronic device or may be downloaded from an external electronic device (e.g., the first electronic device 1102, the second external electronic device 1104, or the server 1106).

The kernel 1320 (e.g., the kernel 1141) may include, for example, a system resource manager 1321 or a device driver 1323. The system resource manager 1321 may perform control, allocation, or retrieval of a system resource. According to an embodiment of the present disclosure, the system resource manager 1321 may include a process management unit, a memory management unit, a file system management unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330, for example, may provide a function that the applications 1370 require in common, or may provide various functions to the applications 1370 through the API 1360 so that the applications 1370 may efficiently use limited system resources in the electronic device. According to an embodiment of the present disclosure, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, a payment manager 1354, and a runtime library 1335.

The payment manager 1354 may relay information for payment from the application 1370 to the application 1370 or kernel 1320. Further, the payment manager 1354 may store information related to the payment, which has been received from an external device, in the electronic device or transfer the internally stored information to an external device. The runtime library 1335 may include, for example, a library module that a complier uses to add a new function through a programming language while the application 1370 is running. The runtime library 1335 may perform a function for input/output management, memory management, or an arithmetic function.

The application manager 1341 may mange, for example, a life cycle of at least one of the applications 1370. The window manager 1342 may manage a GUI resource used in a screen. The multimedia manager 1343 may recognize a format required for playing various media files and may encode or decode a media file using a codec matched to the format. The resource manager 1344 may manage a resource such as a source code, a memory, or a storage space of at least one of the applications 1370.

The power manager 1345, for example, may operate together with a basic input/output system (BIOS) to manage a battery or power and may provide power information required for operating the electronic device. The database manager 1346 may generate, search, or modify a database to be used in at least one of the applications 1370. The package manager 1347 may manage installation or update of an application distributed in a package file format.

The connectivity manger 1348 may manage wireless connection of Wi-Fi, Bluetooth, or the like. The notification manager 1349 may display or notify an event such as message arrival, appointments, and proximity alerts in such a manner as not to disturb a user. The location manager 1350 may manage location information of the electronic device. The graphic manager 1351 may manage a graphic effect to be provided to a user or a user interface related thereto. The security manager 1352 may provide various security functions required for system security or user authentication. According to an embodiment of the present disclosure, in the case in which an electronic device (e.g., the electronic device 1101) includes a phone function, the middleware 1330 may further include a telephony manager for managing a voice or video call function of the electronic device.

The middleware 1330 may include a middleware module for forming a combination of various functions of the above-mentioned elements. The middleware 1330 may provide a module specialized for each type of an operating system to provide differentiated functions. Furthermore, the middleware 1330 may delete a part of existing elements or may add new elements dynamically.

The API 1360 (e.g., the API 1145) which is, for example, a set of API programming functions may be provided in different configurations according to an operating system. For example, in the case of Android™ or iOS™, one API set may be provided for each platform, and, in the case of Tizen™, at least two API sets may be provided for each platform.

The application 1370 (e.g., the application program 1147), for example, may include at least one application capable of performing functions such as a home 1371, a dialer 1372, an short messaging service (SMS)/multimedia messaging Service (MMS) 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384, health care (e.g., measure an exercise amount or blood sugar), or environmental information provision (e.g., provide air pressure, humidity, or temperature information).

According to an embodiment of the present disclosure, the application 1370 may include an information exchange application for supporting information exchange between the electronic device (e.g., the electronic device 1101) and an external electronic device (e.g., the first electronic device 1102 or the second external electronic device 1104). The information exchange application may include, for example, a notification relay application for relaying specific information to the external electronic device or a device management application for managing the external electronic device.

For example, the notification relay application may have a function for relaying, to an external electronic device (e.g., the first electronic device 1102 or the second external electronic device 1104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1102 or the second external electronic device 1104) communicating with the electronic device, an application running in the external electronic device, or a service (e.g., a call service, a message service, or the like) provided from the external electronic device.

According to an embodiment of the present disclosure, the application 1370 may include a specified application (e.g., a healthcare application of a mobile medical device) according to an attribute of the external electronic device (e.g., the first electronic device 1102 or the second external electronic device 1104). The application 1370 may include an application received from an external electronic device (e.g., the first electronic device 1102 or the second external electronic device 1104). The application 1370 may include a preloaded application or a third-party application downloadable from a server. The names of the elements of the program module 1310 illustrated may vary with the type of an operating system.

According to various embodiments of the present disclosure, at least a part of the program module 1310 may be implemented with software, firmware, hardware, or a combination thereof. At least a part of the program module 1310, for example, may be implemented (e.g., executed) by a processor (e.g., the processor 1210). At least a part of the program module 1310 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1120), the processor may perform functions corresponding to the instructions. The computer-readable storage medium may be, for example, the memory 1130.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

According to various embodiments, a storage medium for storing instructions, the instructions, when executed by at least one processor, being configured to cause the at least one processor to perform at least one operation in an electronic device including a processor, a communication interface, a memory, and a secure circuitry, the at least one operation comprising receiving, by the processor, a first public key uniquely stored in the secure circuitry, transmitting, by the processor, the first public key to an external device via the communication interface, receiving, by the processor, a secure program encrypted based on the first public key and a second public key generated by the external device, through the communication interface from the external device, transmitting, by the processor, the second public key and the encrypted secure program to the secure circuitry, and decrypting the encrypted secure program based on the second public key and a first private key which is symmetrical to the first public key.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a communication interface configured to communicate with an external device;
   a memory;
   at least one processor; and
   a secure circuitry connected with the at least one processor over a secure channel,
   wherein the secure circuitry is configured to provide a first public key stored in the secure circuitry to the at least one processor,
   wherein the at least one processor is configured to:
      transmit the first public key to the external device via the communication interface,
      receive an encrypted secure program, encrypted based on the first public key and a second public key generated by the external device, via the communication interface from the external device, and
      transmit the second public key and the encrypted secure program to the secure circuitry, and
   wherein the secure circuitry is configured to:
      decrypt the encrypted secure program based on the second public key and a first private key which is symmetrical to the first public key,
      generate a shared key shared with the external device using the second public key and the first private key, and
      decrypt the encrypted secure program using a decryption key generated using the shared key.

2. The electronic device of claim 1,
   wherein the at least one processor is configured to operate by being divided into a rich execution environment (REE) and a trusted execution environment (TEE), and
   wherein the TEE is configured to:
      establish the secure channel with the secure circuitry, and
      transmit and receive the first public key and data necessary for decrypting the encrypted secure program, over the secure channel.

3. The electronic device of claim 2, wherein the TEE is further configured to:
   collect a first connection key previously stored in a storage module of the secure circuitry; and
   establish a first secure channel with a management module of the secure circuitry based on the first connection key.

4. The electronic device of claim 3, wherein the TEE is further configured to:
   generate a second connection key; and
   establish a second secure channel with the management module using the second connection key.

5. The electronic device of claim 1, wherein the secure circuitry is further configured to store the first public key and the first private key uniquely assigned to the secure circuitry when the secure circuitry is manufactured or at a time when the secure circuitry is mounted on the electronic device.

6. The electronic device of claim 1, wherein the encrypted secure program is encrypted based on a second private key corresponding to the second public key and the first public key by the external device.

7. The electronic device of claim 6, wherein the encrypted secure program is encrypted using an encryption key uniquely assigned to the secure circuitry by the external device.

8. The electronic device of claim 1,
   wherein the secure circuitry is further configured to transmit key verification information for verifying validity of the generated shared key to the at least one processor, and
   wherein, if the key verification information is valid, the at least one processor is configured to provide the encrypted secure program to the secure circuitry.

9. The electronic device of claim 8, wherein the at least one processor is further configured to determine validity of the shared key by comparing key certification information stored together with the encrypted secure program with the key verification information.

10. The electronic device of claim 9, wherein the at least one processor is further configured to receive the encrypted secure program and the key certification information from the external device.

11. The electronic device of claim 9, wherein the at least one processor is further configured to receive the second public key, the encrypted secure program, and the key certification information as a binary from the external device.

12. The electronic device of claim 11, wherein the at least one processor is further configured to test suitability of a signature for the binary.

13. The electronic device of claim 1, wherein the second public key comprises a public key between asymmetric keys, randomly generated in the external device, used to encrypt the secure program.

14. The electronic device of claim 1, wherein the secure circuitry is further configured to perform at least one of deleting, installing, or updating at least one applet in the secure circuitry by executing the secure program.

15. A program management method performed in an electronic device including at least one processor, a memory, a communication interface, and a secure circuitry, the method comprising:
   receiving, by the at least one processor, a first public key uniquely stored in the secure circuitry;
   transmitting, by the at least one processor, the first public key to an external device via the communication interface;
   receiving, by the at least one processor, an encrypted secure program, encrypted based on the first public key and a second public key generated by the external device, through the communication interface from the external device;
   transmitting, by the at least one processor, the second public key and the encrypted secure program to the secure circuitry to the secure circuitry;
   decrypting, by the secure circuitry, the encrypted secure program based on the second public key and a first private key which is symmetrical to the first public key;
   generating a shared key shared with the external device using the second public key and the first private key; and
   decrypting the encrypted secure program using a decryption key generated using the shared key.

16. The method of claim 15, wherein the receiving of the first public key comprises:
   establishing a secure channel between a trusted execution environment (TEE) of the at least one processor and the secure circuitry; and
   receiving, by the at least one processor, the first public key over the secure channel.

17. The method of claim 15, wherein the decrypting of the encrypted secure program comprises:
   generating, by the secure circuitry, a shared key shared with the external device using the second public key and the first private key; and
   decrypting, by the secure circuitry, the encrypted secure program using a decryption key generated using the shared key.

18. The method of claim 17, wherein the generating of the shared key comprises:
   generating, by the secure circuitry, key verification information for verifying validity of the generated shared key;
   receiving, by the at least one processor, the key verification information from the secure circuitry; and
   determining, by the at least one processor, validity of the shared key based on the key verification information.

* * * * *